(12) United States Patent
Randle et al.

(10) Patent No.: US 8,327,436 B2
(45) Date of Patent: Dec. 4, 2012

(54) INFRASTRUCTURE ARCHITECTURE FOR SECURE NETWORK MANAGEMENT WITH PEER TO PEER FUNCTIONALITY

(76) Inventors: William M. Randle, Bexley, OH (US); Randall E. Orkis, Pataskala, OH (US)

( * ) Notice: Subject to any disclaimer, the term of this patent is extended or adjusted under 35 U.S.C. 154(b) by 897 days.

(21) Appl. No.: 11/426,806

(22) Filed: Jun. 27, 2006

(65) Prior Publication Data

US 2007/0112578 A1    May 17, 2007

Related U.S. Application Data

(63) Continuation-in-part of application No. 10/967,991, filed on Oct. 19, 2004, and a continuation-in-part of application No. 10/846,114, filed on May 15, 2004, now abandoned, and a continuation-in-part of application No. 10/823,442, filed on Apr. 12, 2004, now abandoned, and a continuation-in-part of application No. 10/459,694, filed on Jun. 11, 2003, now Pat. No. 7,568,222, and a continuation-in-part of application No. 10/283,038, filed on Oct. 25, 2002, now Pat. No. 7,565,326.

(60) Provisional application No. 60/694,456, filed on Jun. 27, 2005.

(51) Int. Cl.
*G06F 9/00* (2006.01)
(52) U.S. Cl. ............ 726/15; 726/6; 726/2; 726/18; 713/182; 705/1
(58) Field of Classification Search .......... 709/223–226; 726/2–10, 15; 705/1
See application file for complete search history.

(56) References Cited

U.S. PATENT DOCUMENTS

| | | | | |
|---|---|---|---|---|
| 6,061,796 A * | 5/2000 | Chen et al. | | 726/15 |
| 6,304,973 B1 * | 10/2001 | Williams | | 726/3 |
| 6,640,302 B1 * | 10/2003 | Subramaniam et al. | | 713/169 |
| 6,993,026 B1 * | 1/2006 | Baum et al. | | 370/392 |
| 7,065,092 B2 * | 6/2006 | Chen et al. | | 370/395.52 |
| 7,065,783 B2 * | 6/2006 | Rygaard | | 726/4 |
| 7,069,437 B2 * | 6/2006 | Williams | | 713/166 |
| 7,092,914 B1 * | 8/2006 | Shear et al. | | 705/67 |
| 7,133,846 B1 * | 11/2006 | Ginter et al. | | 705/54 |
| 7,165,041 B1 * | 1/2007 | Guheen et al. | | 705/26.1 |
| 7,168,093 B2 * | 1/2007 | Hrabik et al. | | 726/22 |
| 7,275,102 B2 * | 9/2007 | Yeager et al. | | 709/224 |
| 7,308,496 B2 * | 12/2007 | Yeager et al. | | 709/224 |
| 7,315,903 B1 * | 1/2008 | Bowden | | 709/250 |
| 7,370,358 B2 * | 5/2008 | Ghanea-Hercock | | 726/23 |
| 7,448,076 B2 * | 11/2008 | Ocepek et al. | | 726/11 |
| 7,568,222 B2 * | 7/2009 | Randle et al. | | 726/8 |
| 7,571,467 B1 * | 8/2009 | Priestley et al. | | 726/6 |
| 8,204,992 B2 * | 6/2012 | Arora et al. | | 709/226 |

(Continued)

OTHER PUBLICATIONS

Schollmeier R, Peer-Peer Networking, Aug. 27, 2001, IEEE, Conference Notes—Aug. 2001, pp. 101-102.*

(Continued)

*Primary Examiner* — Nathan Flynn
*Assistant Examiner* — Viral Lakhia
(74) *Attorney, Agent, or Firm* — Porter Wright Morris & Arthur, LLP

(57) ABSTRACT

Architecture defining a secure virtual network of communities of two or more participants where security and business management reporting is a result of a network architecture and where participants can maintain absolute security and control over their services independent of any other participant according to implemented selection rules of the network architecture administration.

11 Claims, 21 Drawing Sheets

Virtual Network Management Layer Managed on a Traditional Physical Network Infrastructure

U.S. PATENT DOCUMENTS

| | | | |
|---|---|---|---|
| 2001/0056402 A1* | 12/2001 | Ahuja et al. | 705/43 |
| 2002/0016926 A1* | 2/2002 | Nguyen et al. | 713/201 |
| 2002/0049902 A1* | 4/2002 | Rhodes | 713/153 |
| 2002/0062451 A1* | 5/2002 | Scheidt et al. | 713/201 |
| 2003/0009675 A1* | 1/2003 | Rygaard | 713/182 |
| 2003/0041141 A1* | 2/2003 | Abdelaziz et al. | 709/223 |
| 2003/0046396 A1* | 3/2003 | Richter et al. | 709/226 |
| 2003/0070070 A1* | 4/2003 | Yeager et al. | 713/157 |
| 2003/0105812 A1* | 6/2003 | Flowers et al. | 709/203 |
| 2003/0140142 A1* | 7/2003 | Marples et al. | 709/225 |
| 2003/0200172 A1 | 10/2003 | Randle et al. | |
| 2003/0210686 A1* | 11/2003 | Terrell et al. | 370/389 |
| 2003/0212904 A1* | 11/2003 | Randle et al. | 713/200 |
| 2004/0056923 A1* | 3/2004 | Silverbrook | 347/42 |
| 2004/0064693 A1* | 4/2004 | Pabla et al. | 713/168 |
| 2005/0071283 A1 | 3/2005 | Randle et al. | |
| 2006/0015450 A1 | 1/2006 | Guck et al. | |
| 2006/0182123 A1* | 8/2006 | Monette et al. | 370/395.53 |
| 2006/0182146 A1* | 8/2006 | Monette et al. | 370/473 |

OTHER PUBLICATIONS

Excerpts from the decision in: In the matter, Wells Fargo Bank, N.A., Claimant, and Data Treasury Corporation and, WMR e-PIN LLC, e-Banc, LLC, and Synoran, AAA No. 65 117 00005 07 delivered on Jul. 21, 2008.

* cited by examiner

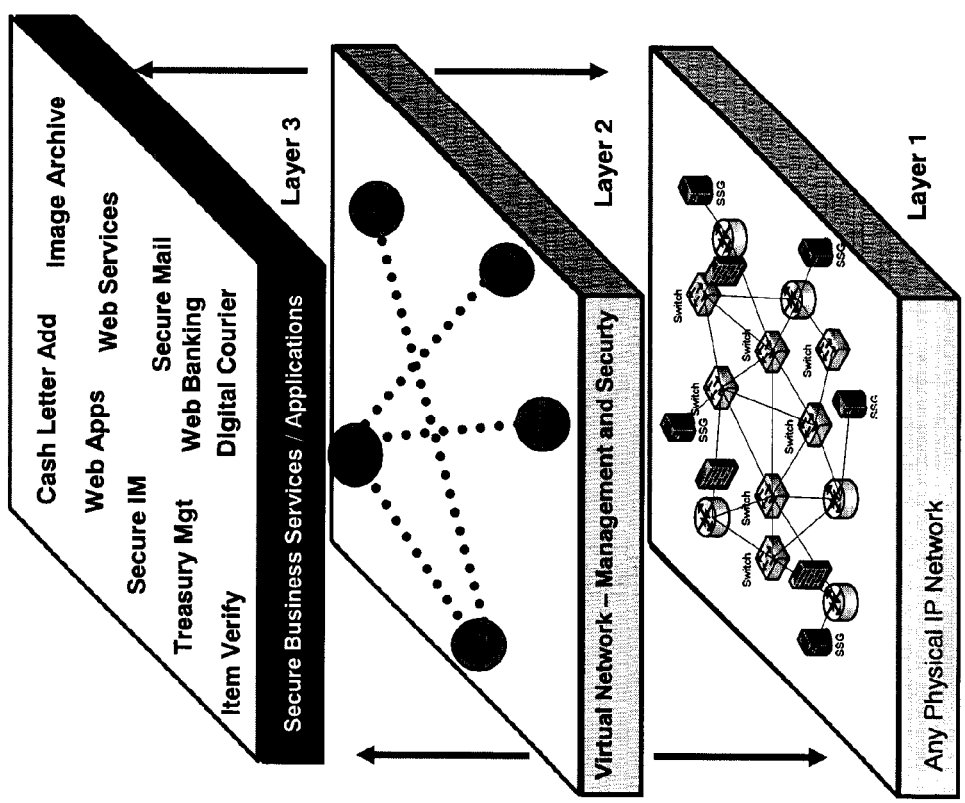
Figure 1, Virtual Network Management Layer Managed on a Traditional Physical Network Infrastructure

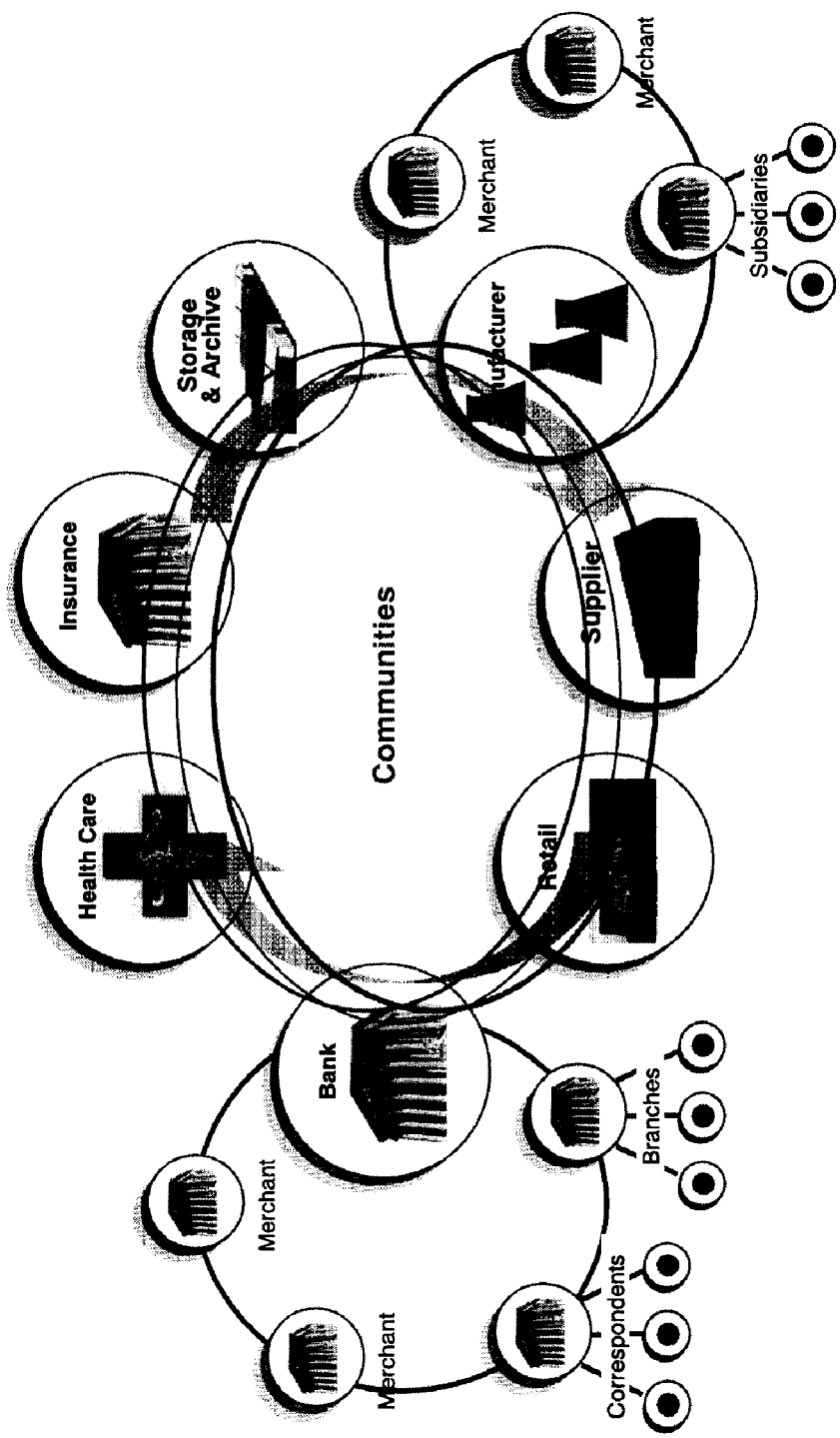
Figure 2, Secure Virtual Network Communities Independent of Physical Transport Provider

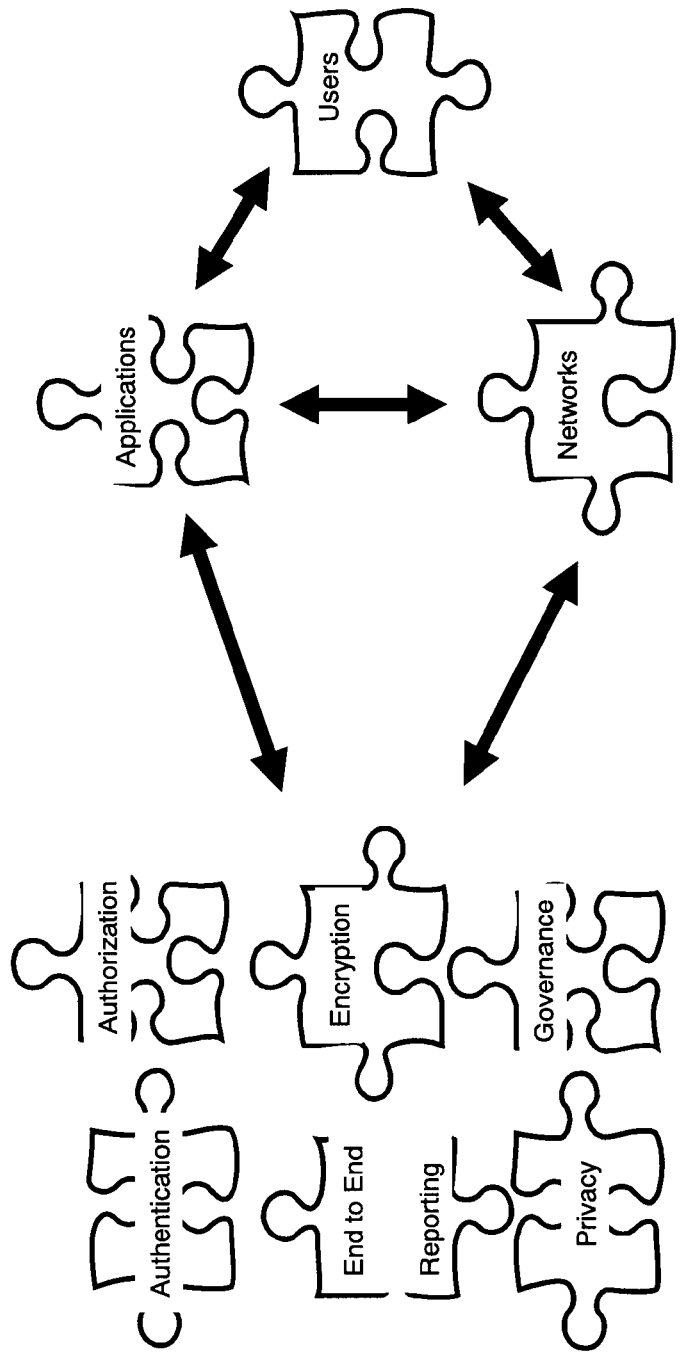
Figure 3, Security Components and Fragmentation Across Users, Networks, and Application Domains. Network security Market is Highly Fragmented Across Multiple Domains

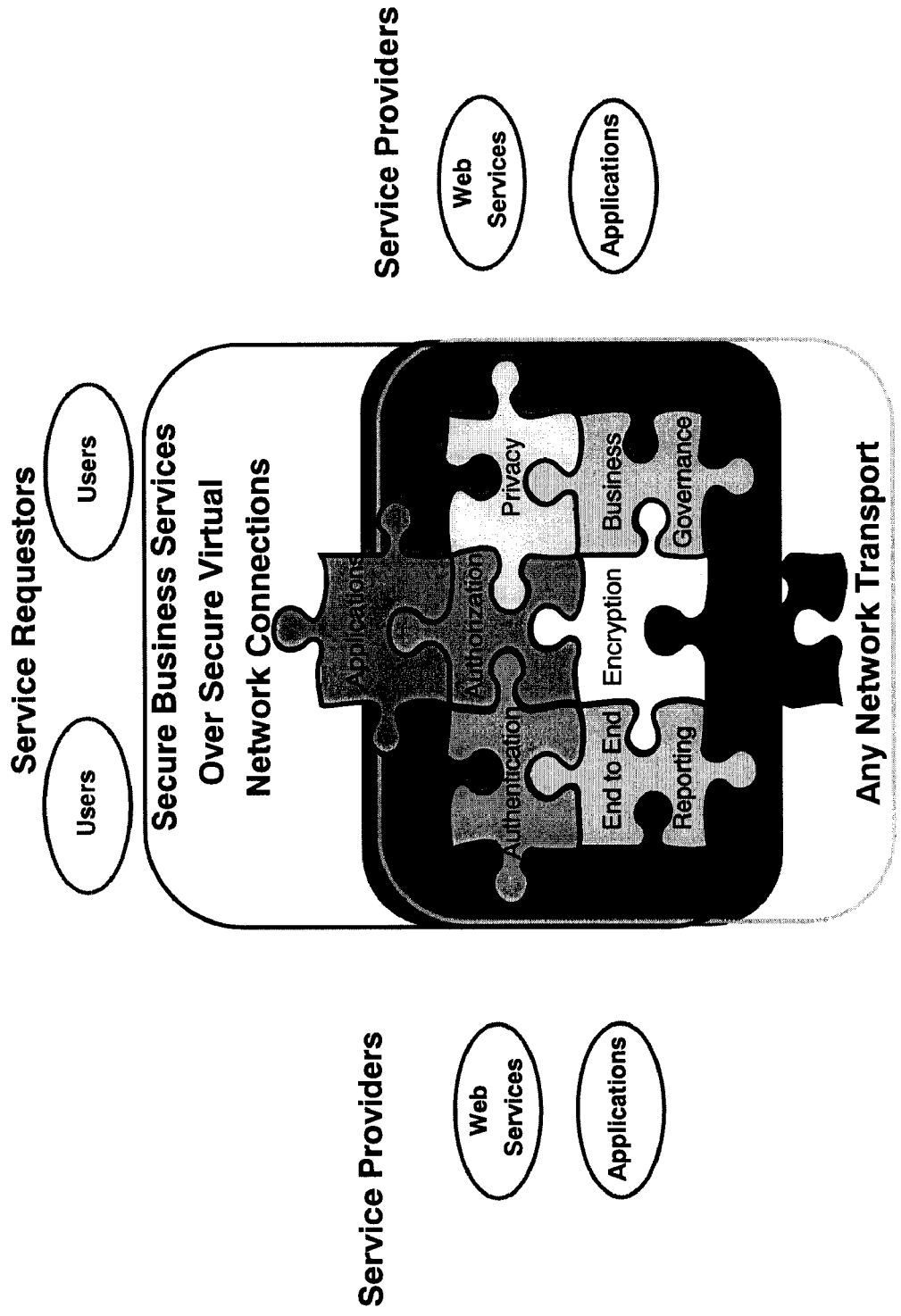
Figure 4, Example of Integrated security, management reporting, and governance components. The Managed Service Pulls it Together Allowing for Secure Virtual Network Communities

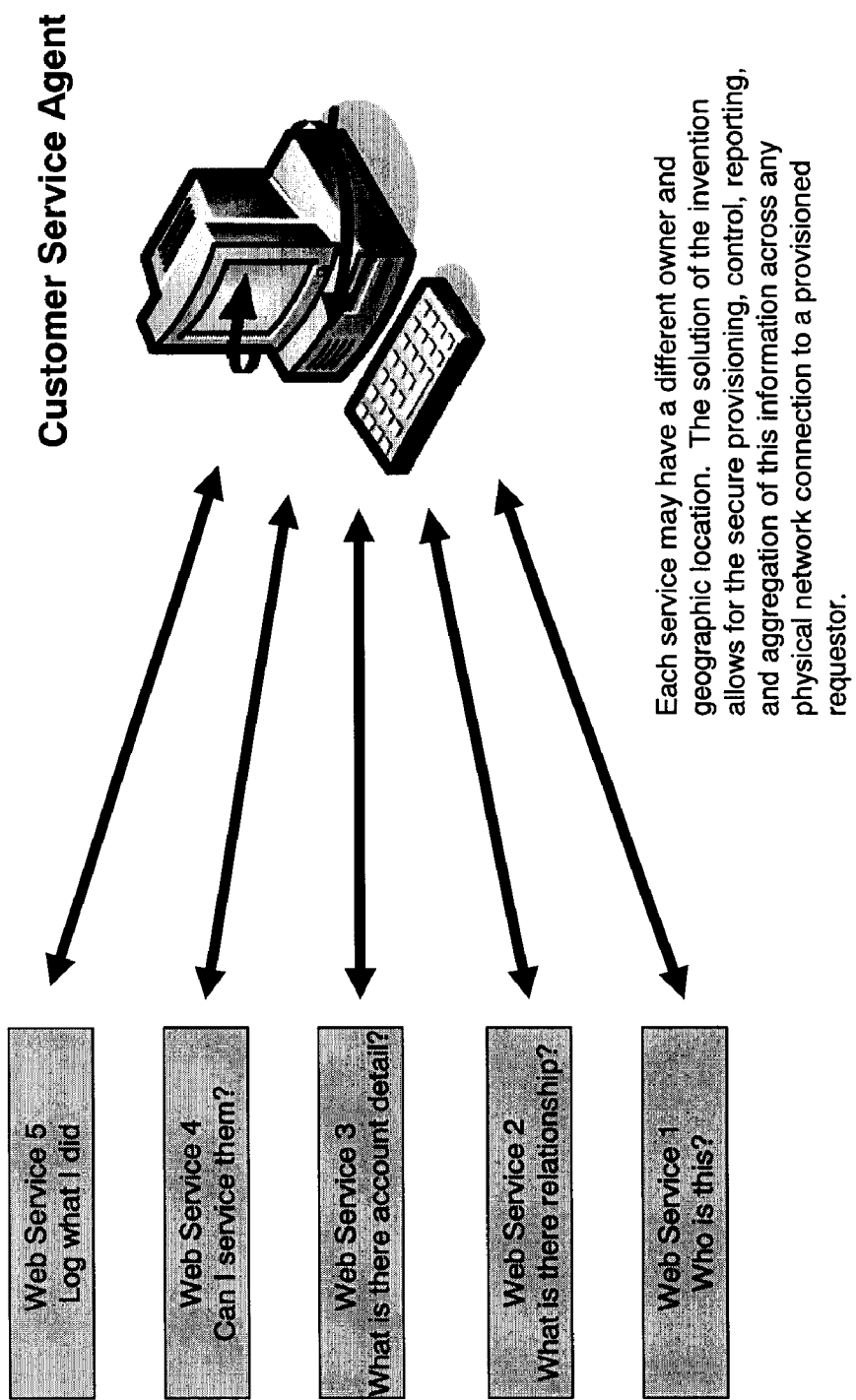

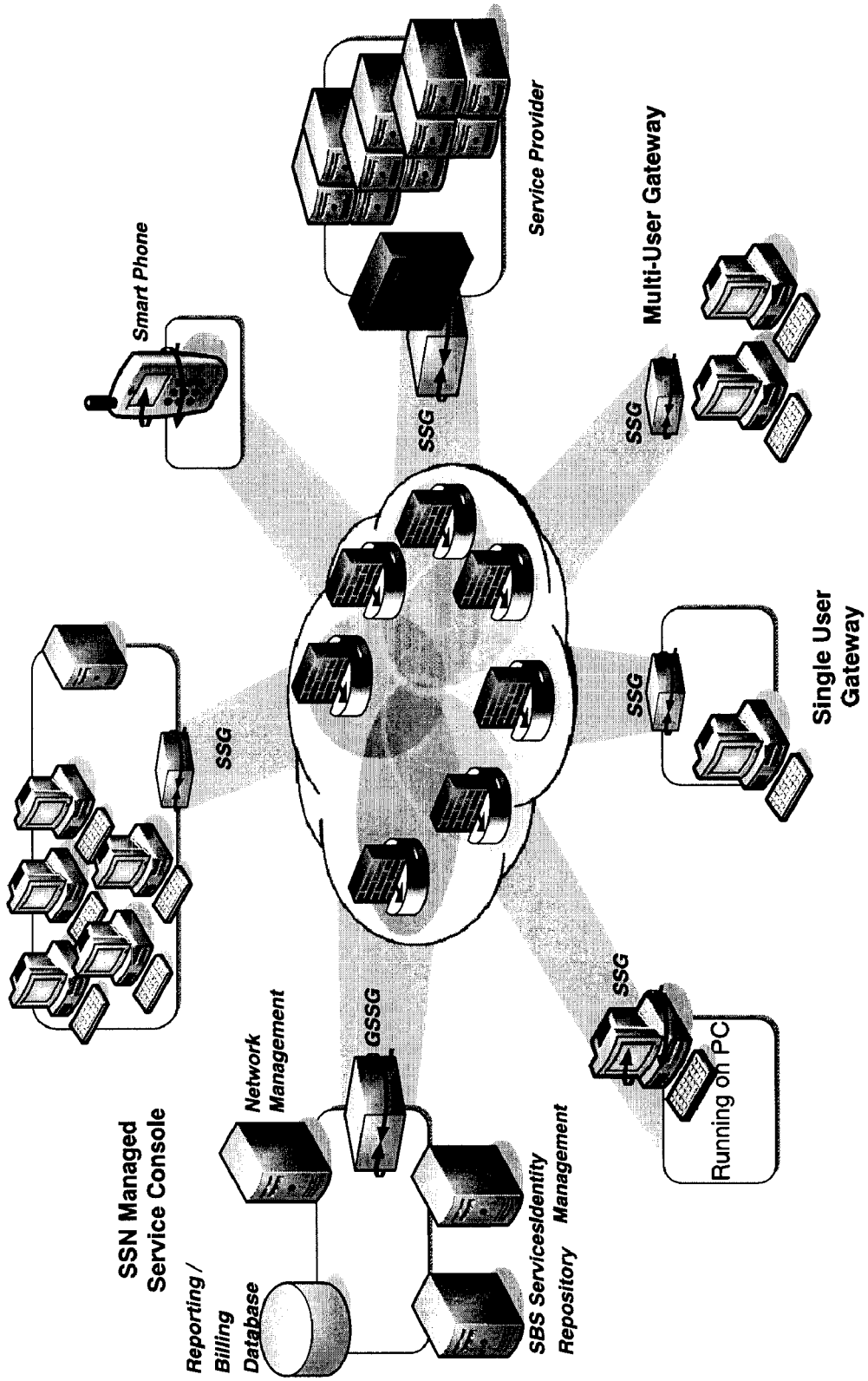
Figure 6, Node Configuration Example: SSN Configuration Diagram: Large to Wireless Users

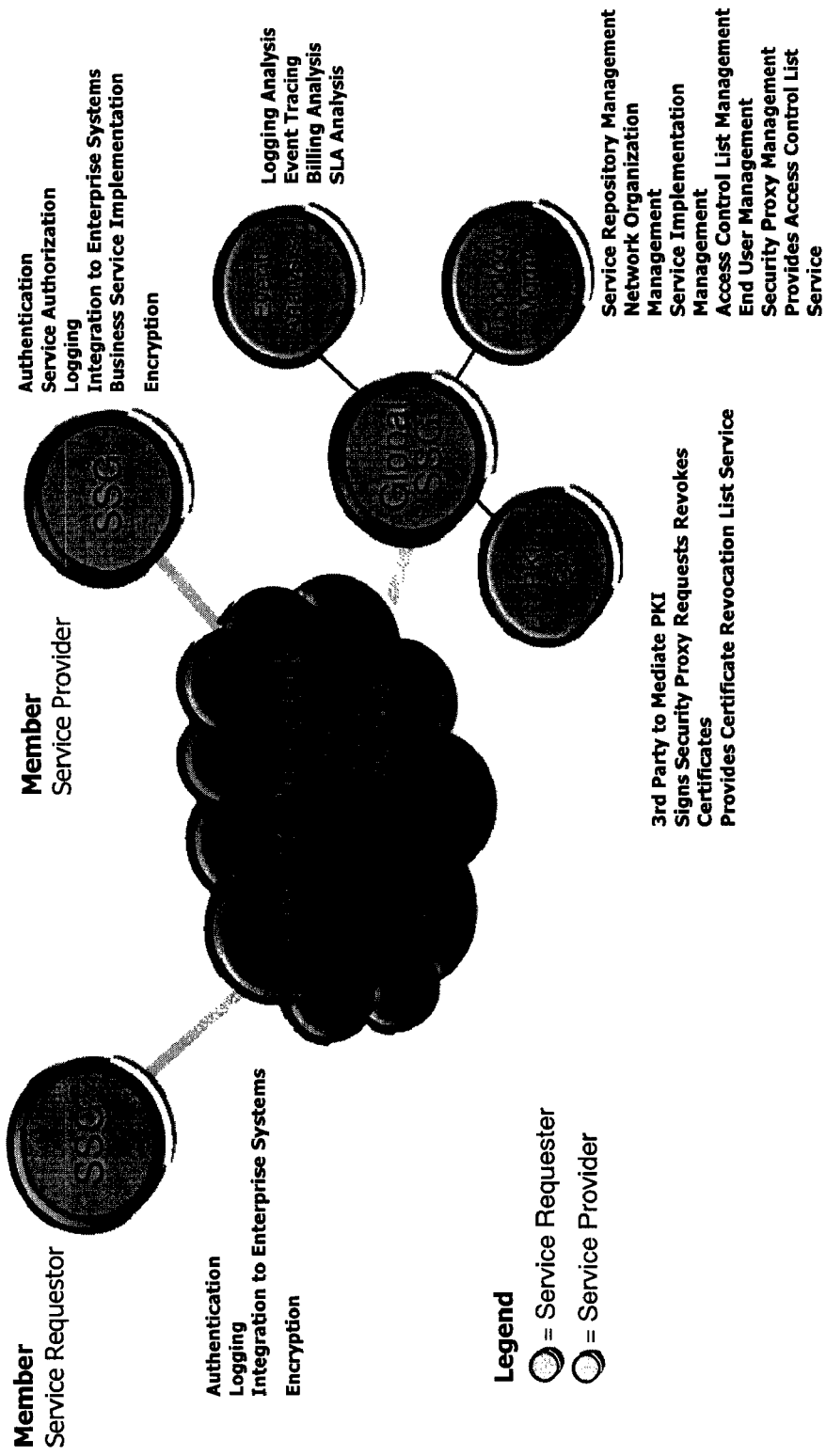
Figure 7, Example: Management Topology, Infrastructure Services, and Functions of the Solution

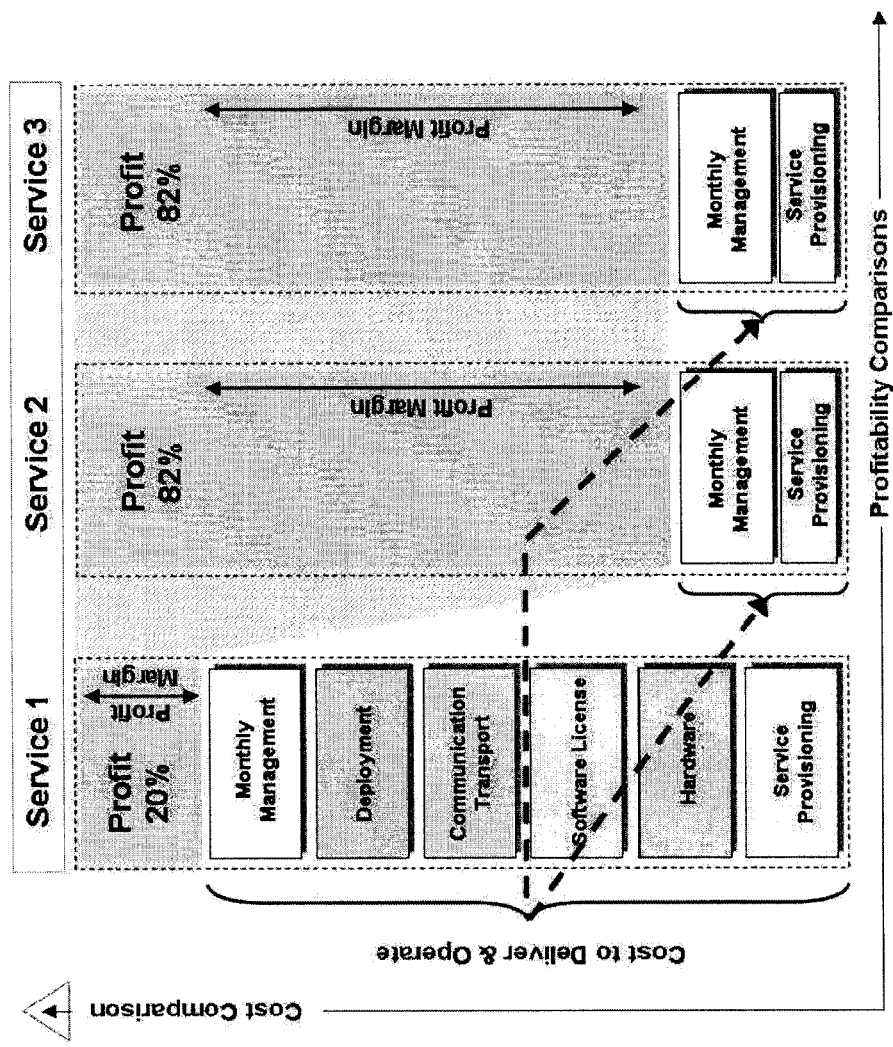
Figure 8, Comparison of Conventional Private Network vs the Solution of the Invention

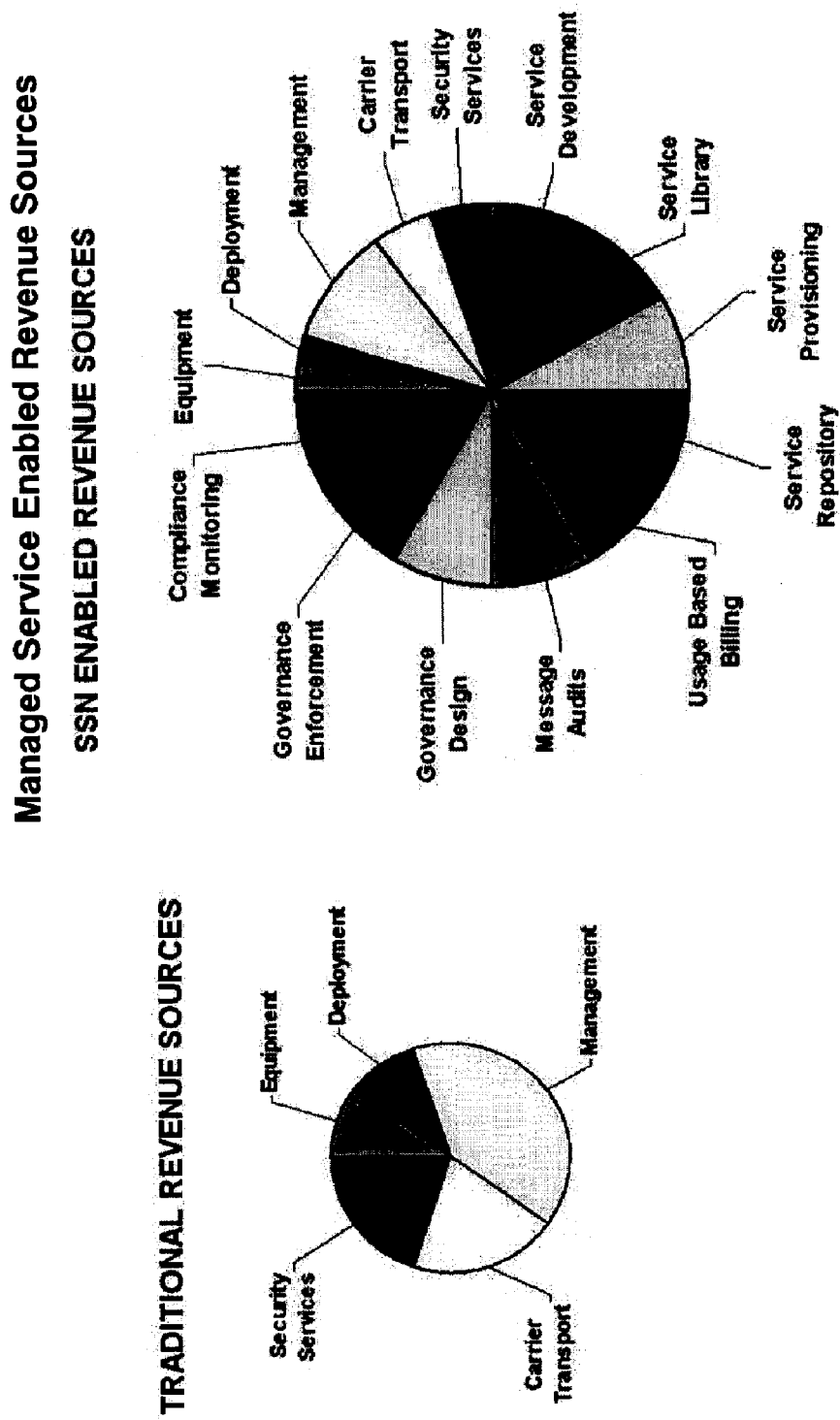
Figure 9, Sample of Revenue Opportunities Comparison

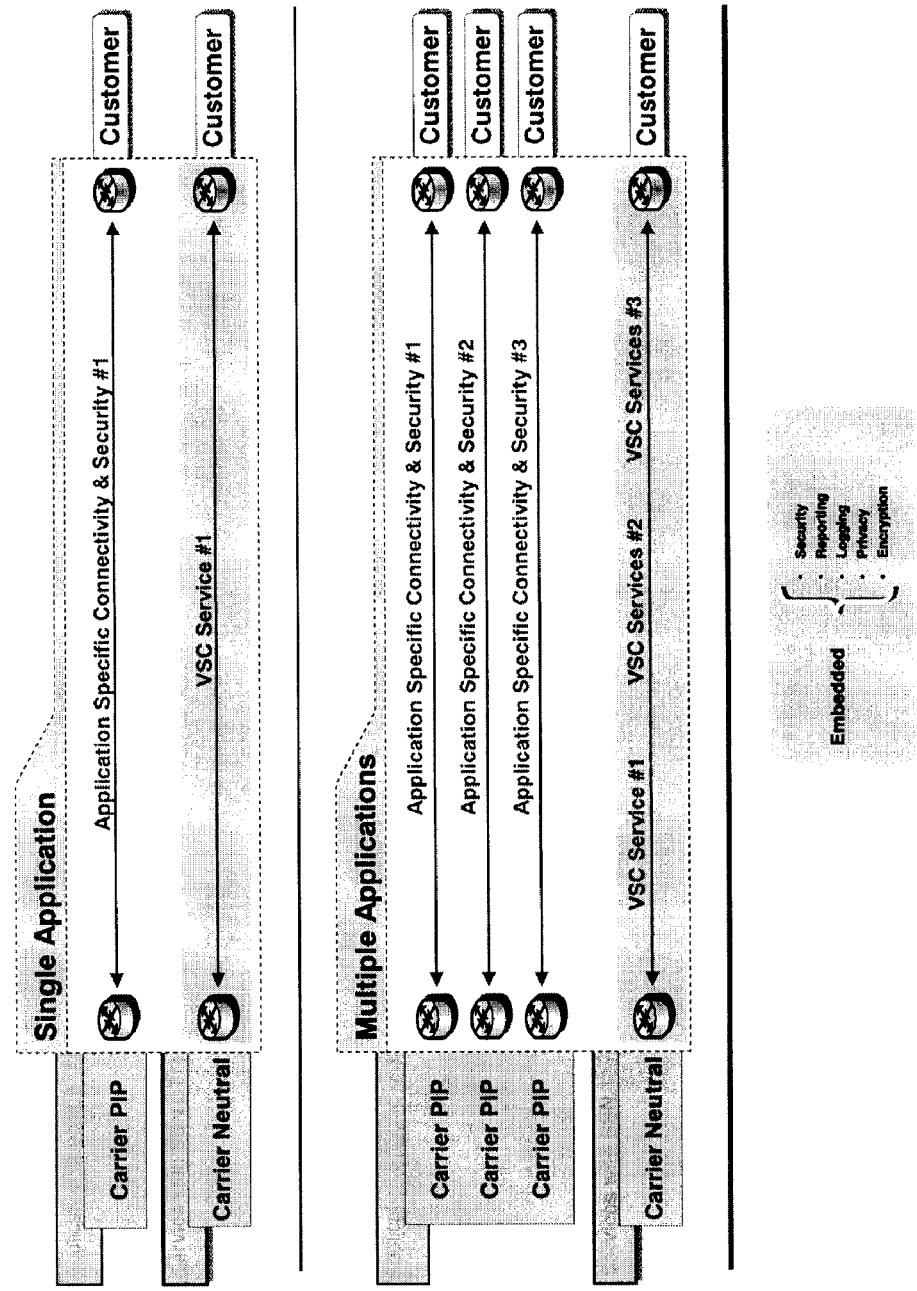
Figure 10, Illustration of VSCs vs Traditional Dedicated Carrier Function Specific Network Connections

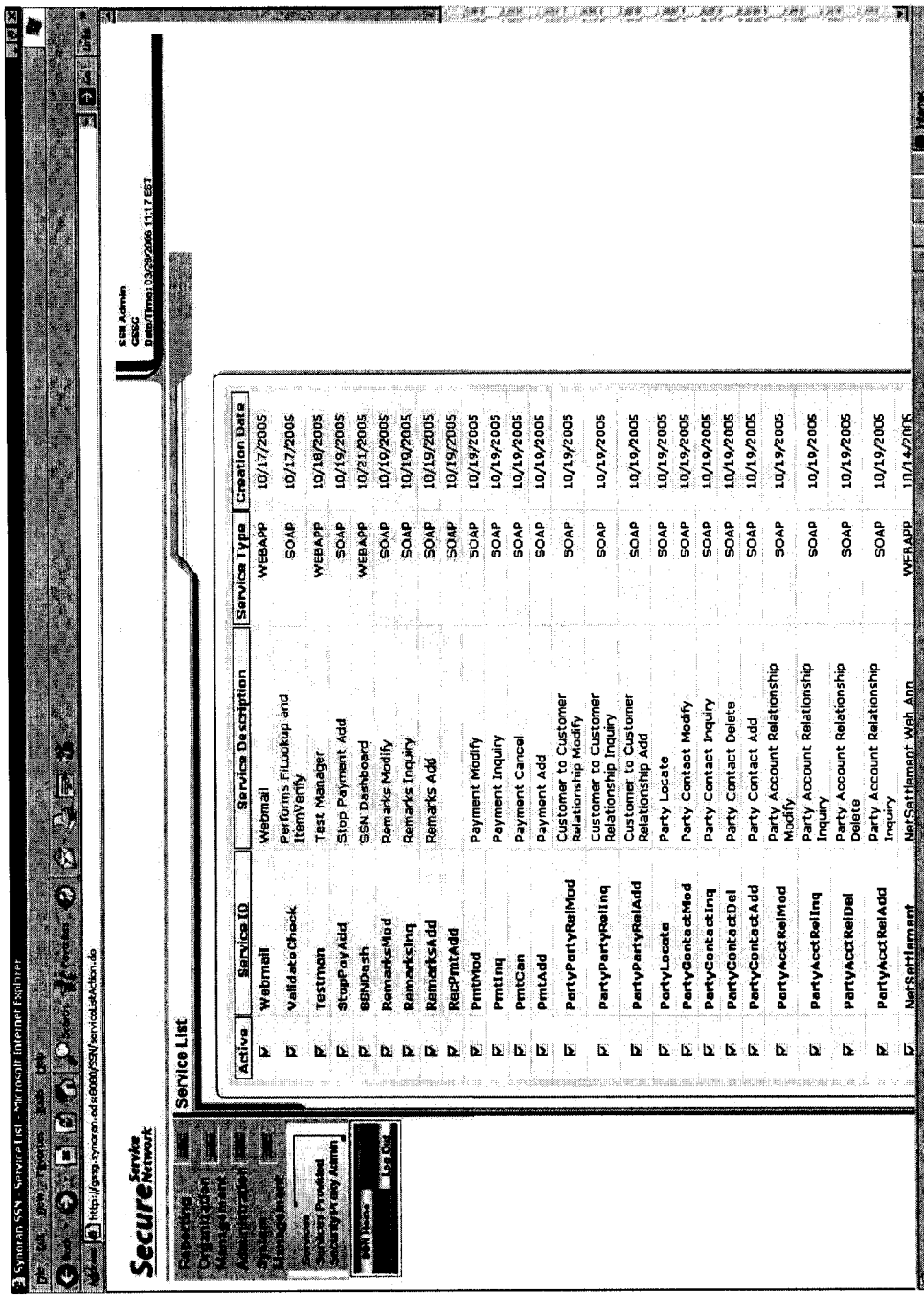
Figure 11, Management Console View - Service Listing

Figure 12, Management Console View - Services Provided List

| Provided Service | Service ID | Service Description | Service Type | Allow Entitlement |
|---|---|---|---|---|
| ☐ | Webmail | Webmail | WEBAPP | ☐ |
| ☐ | ValidateCheck | Performs FI Lookup and ItemVerify | SOAP | ☐ |
| ☑ | Testman | Test Manager | WEBAPP | ☐ |
| ☐ | StopPayAdd | Stop Payment Add | SOAP | ☐ |
| ☑ | SSNDash | SSN Dashboard | WEBAPP | ☑ |
| ☑ | RemarksMod | Remarks Modify | SOAP | ☐ |
| ☐ | RemarksInq | Remarks Inquiry | SOAP | ☐ |
| ☐ | RemarksAdd | Remarks Add | SOAP | ☐ |
| ☐ | RecDectAdd | | SOAP | ☐ |
| ☐ | PmtMod | Payment Modify | SOAP | ☐ |
| ☐ | PmtInq | Payment Inquiry | SOAP | ☐ |
| ☐ | PmtCan | Payment Cancel | SOAP | ☐ |
| ☐ | PmtAdd | Payment Add | SOAP | ☐ |
| ☐ | PartyPartyRelMod | Customer to Customer Relationship Modify | SOAP | ☐ |
| ☐ | PartyPartyRelInq | Customer to Customer Relationship Inquiry | SOAP | ☐ |
| ☐ | PartyPartyRelAdd | Customer to Customer Relationship Add | SOAP | ☐ |
| ☐ | PartyLocate | Party Locate | SOAP | ☐ |
| ☐ | PartyContactMod | Party Contact Modify | SOAP | ☐ |
| ☐ | PartyContactInq | Party Contact Inquiry | SOAP | ☐ |
| ☐ | PartyContactDel | Party Contact Delete | SOAP | ☐ |
| ☐ | PartyContactAdd | Party Contact Add | SOAP | ☐ |
| ☐ | PartyAcctRelMod | Party Account Relationship Modify | SOAP | ☐ |
| ☐ | PartyAcctRelInq | Party Account Relationship Inquiry | SOAP | ☐ |
| ☐ | PartyAcctRelDel | Party Account Relationship Delete | SOAP | ☐ |
| ☐ | PartyAcctRelAdd | Party Account Relationship Inquiry | SOAP | ☐ |
| ☐ | NetSettlement | NetSettlement Web App | WEBAPP | ☐ |

Figure 13, Management Console View - Service Analysis Report

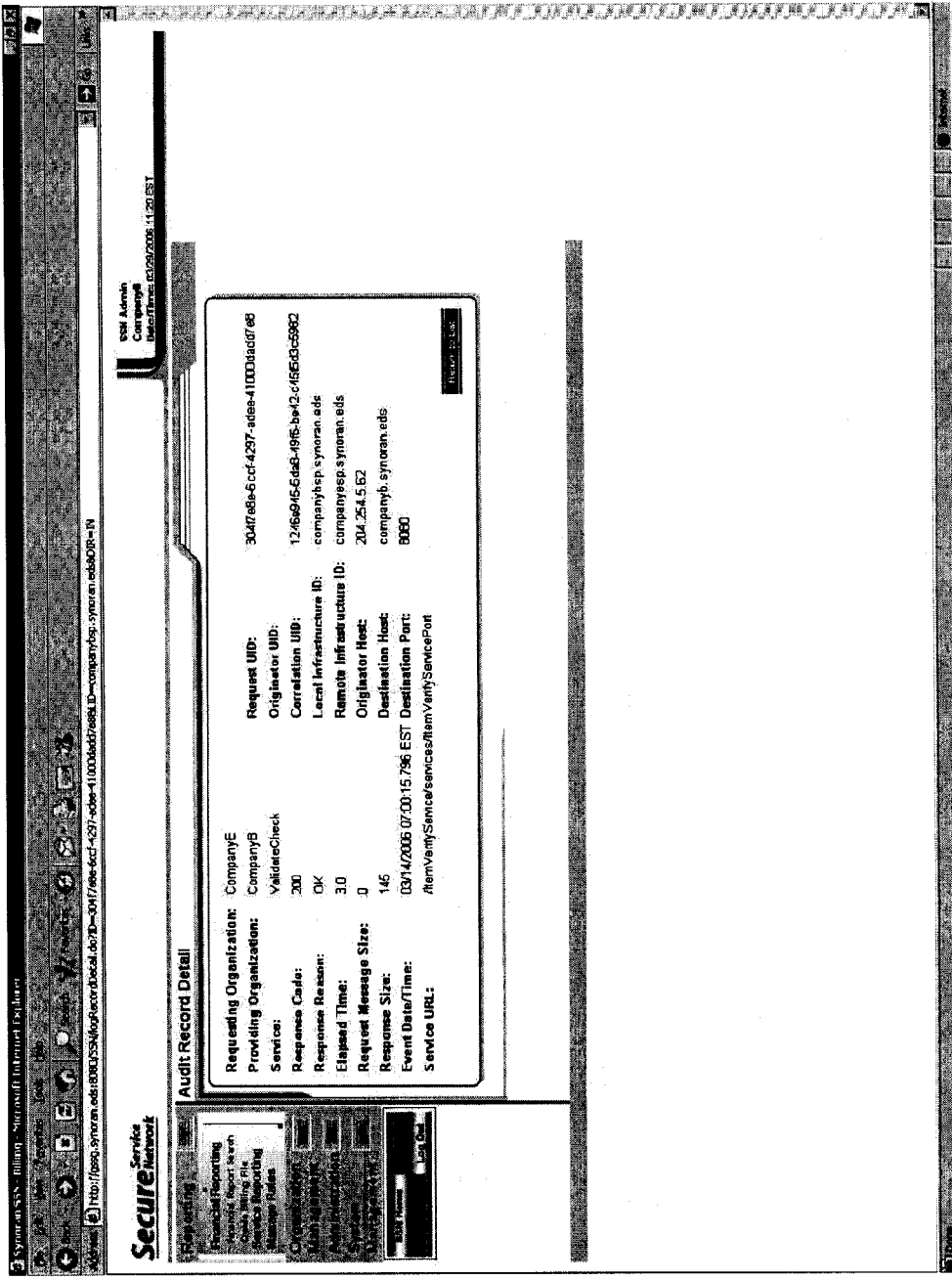
Figure 14, Management Console View - Audit Record Detail

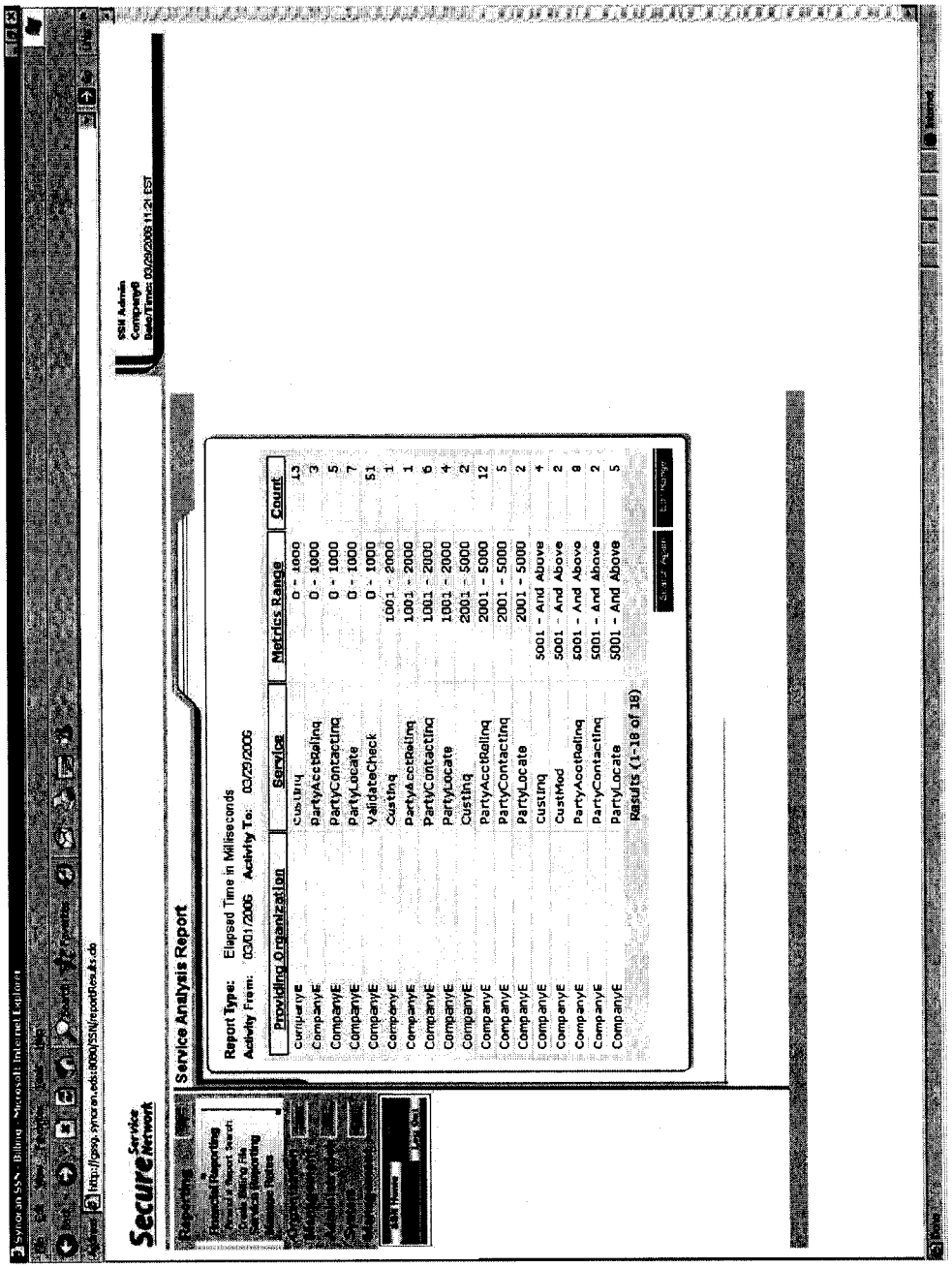
Figure 15, Management Console View - Service Analysis Report - Elapsed Time

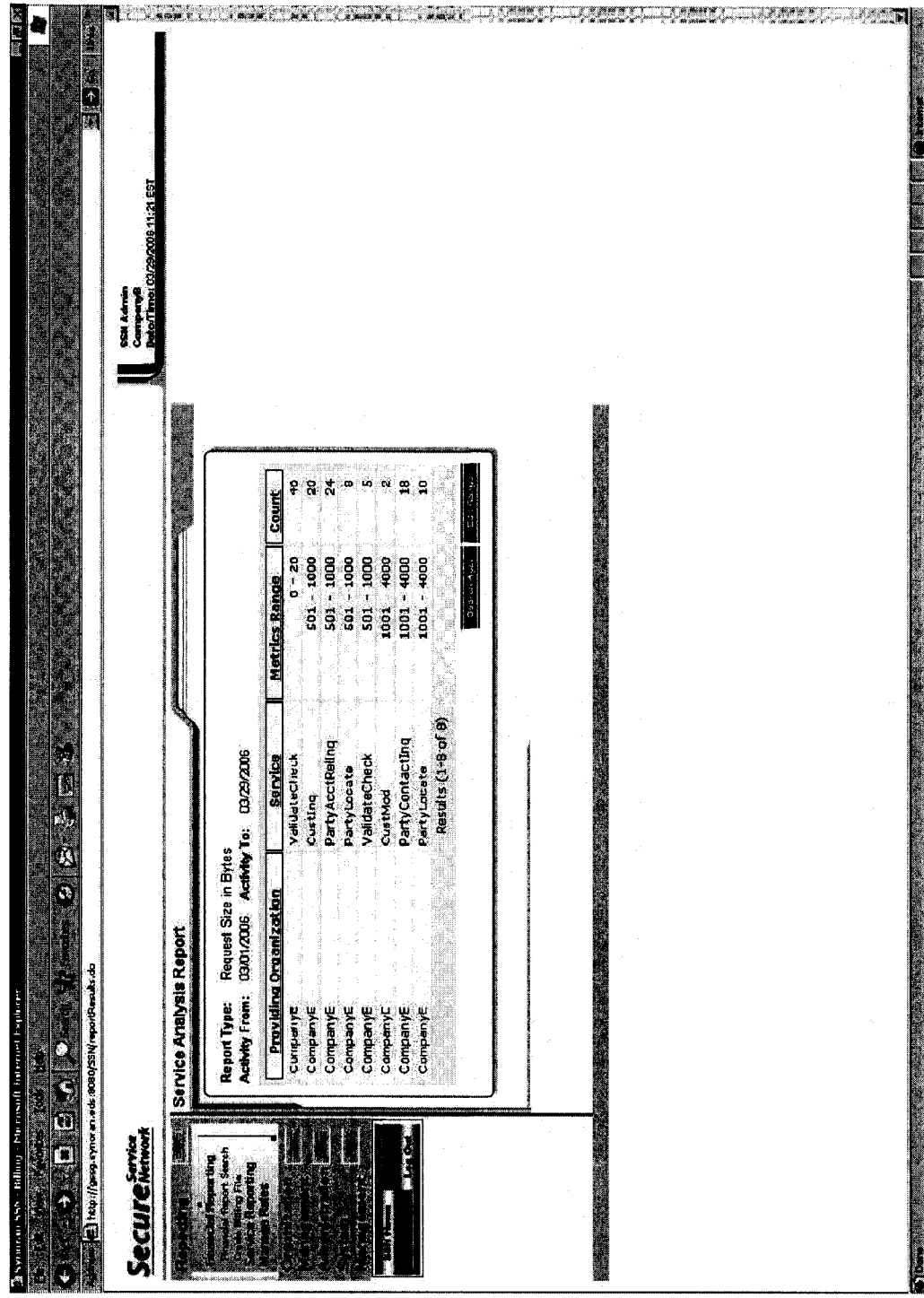
Figure 16, Management Console View - Service Analysis Report - Request Size

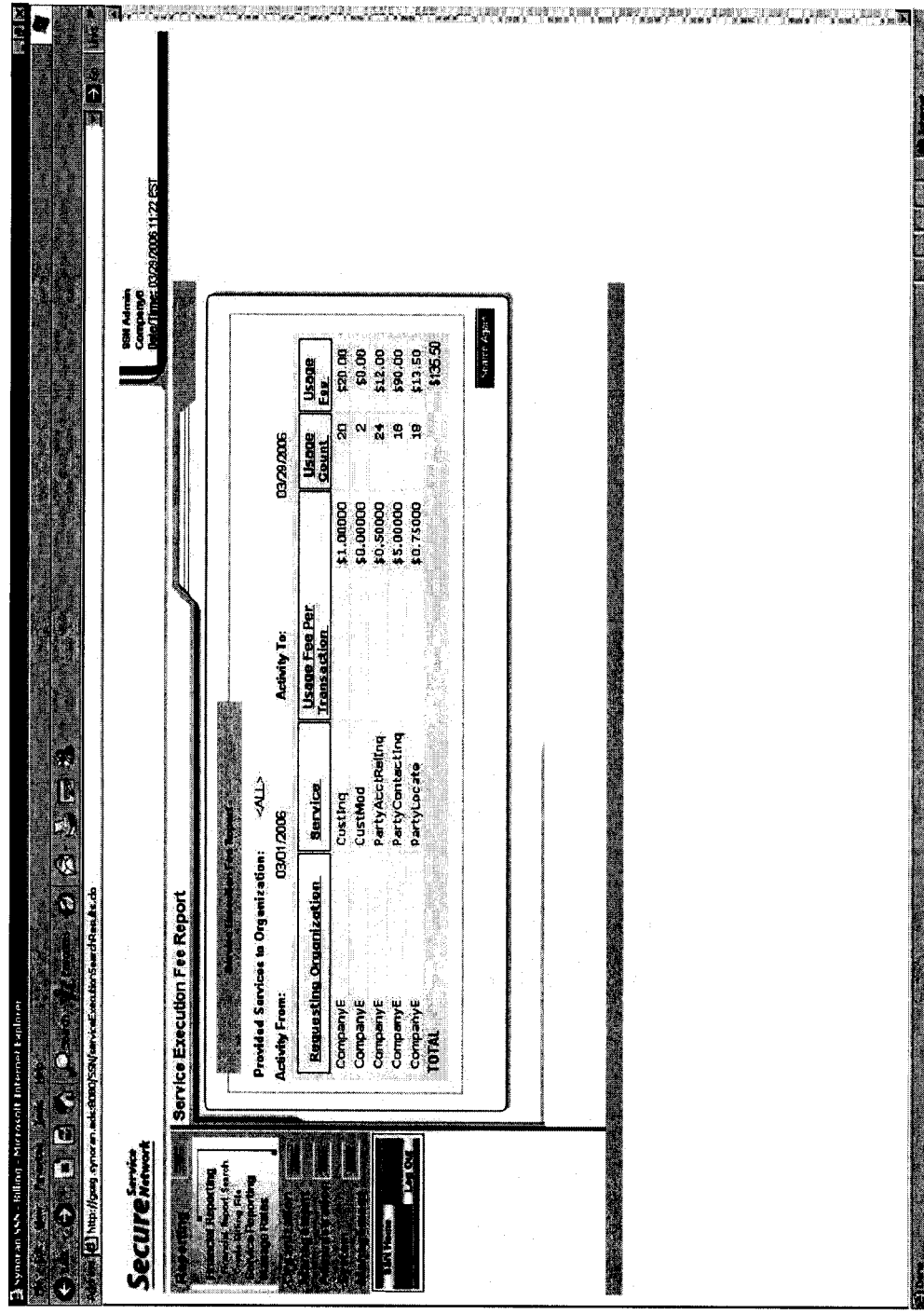
Figure 17, Management Console View - Service Execution Fee Report

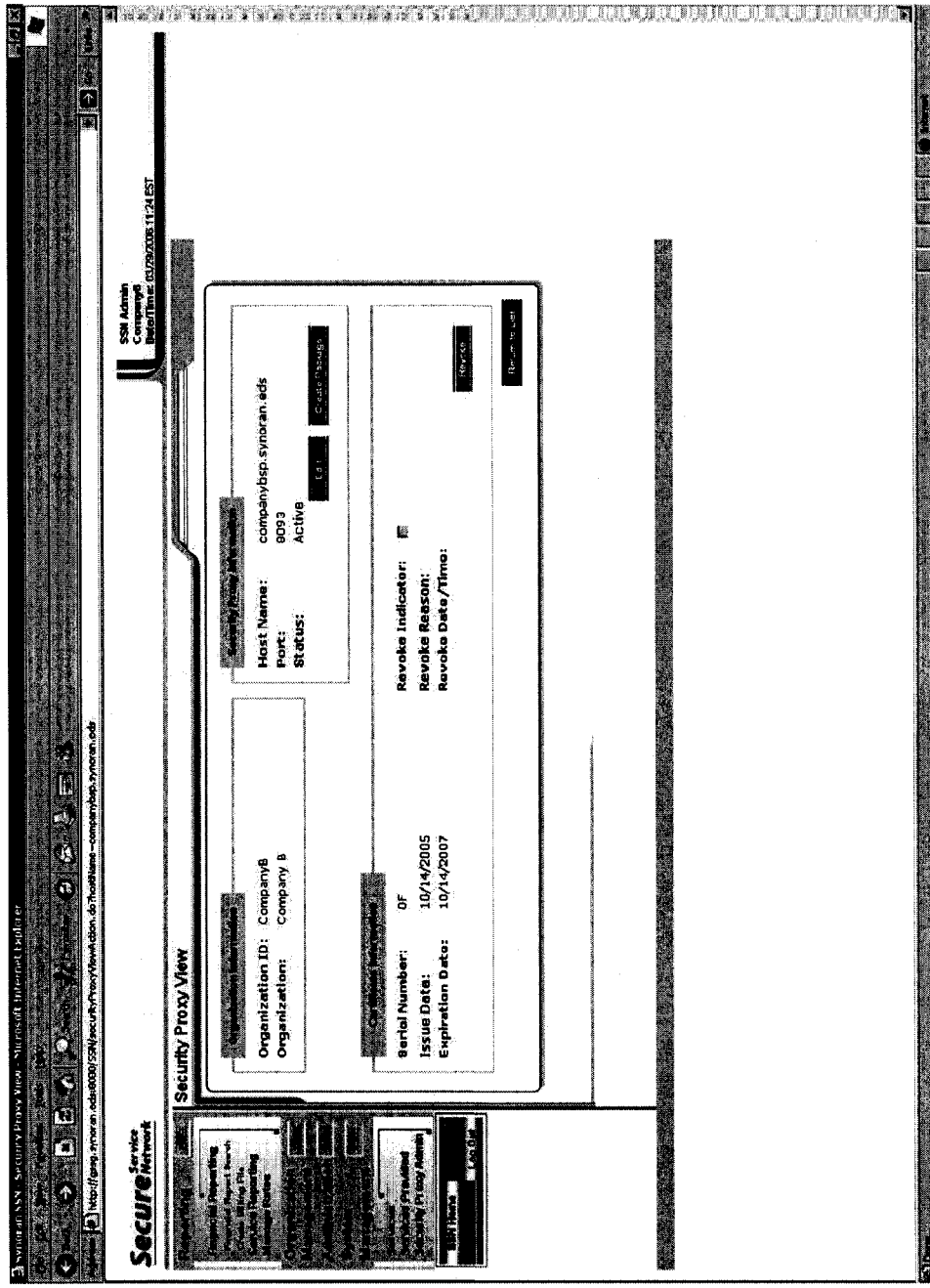
Figure 18, Management Console View - Security Proxy View

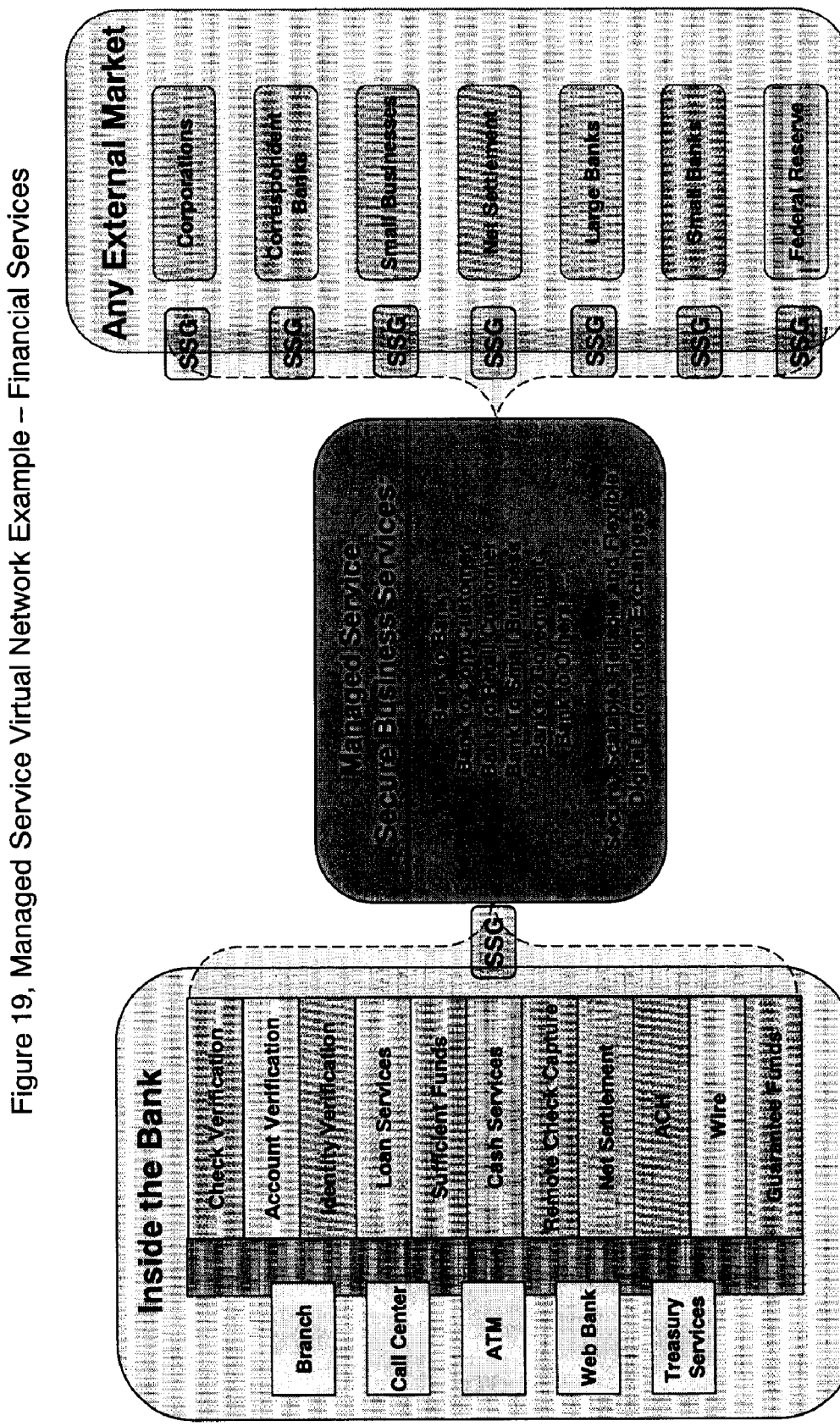
Figure 19, Managed Service Virtual Network Example – Financial Services

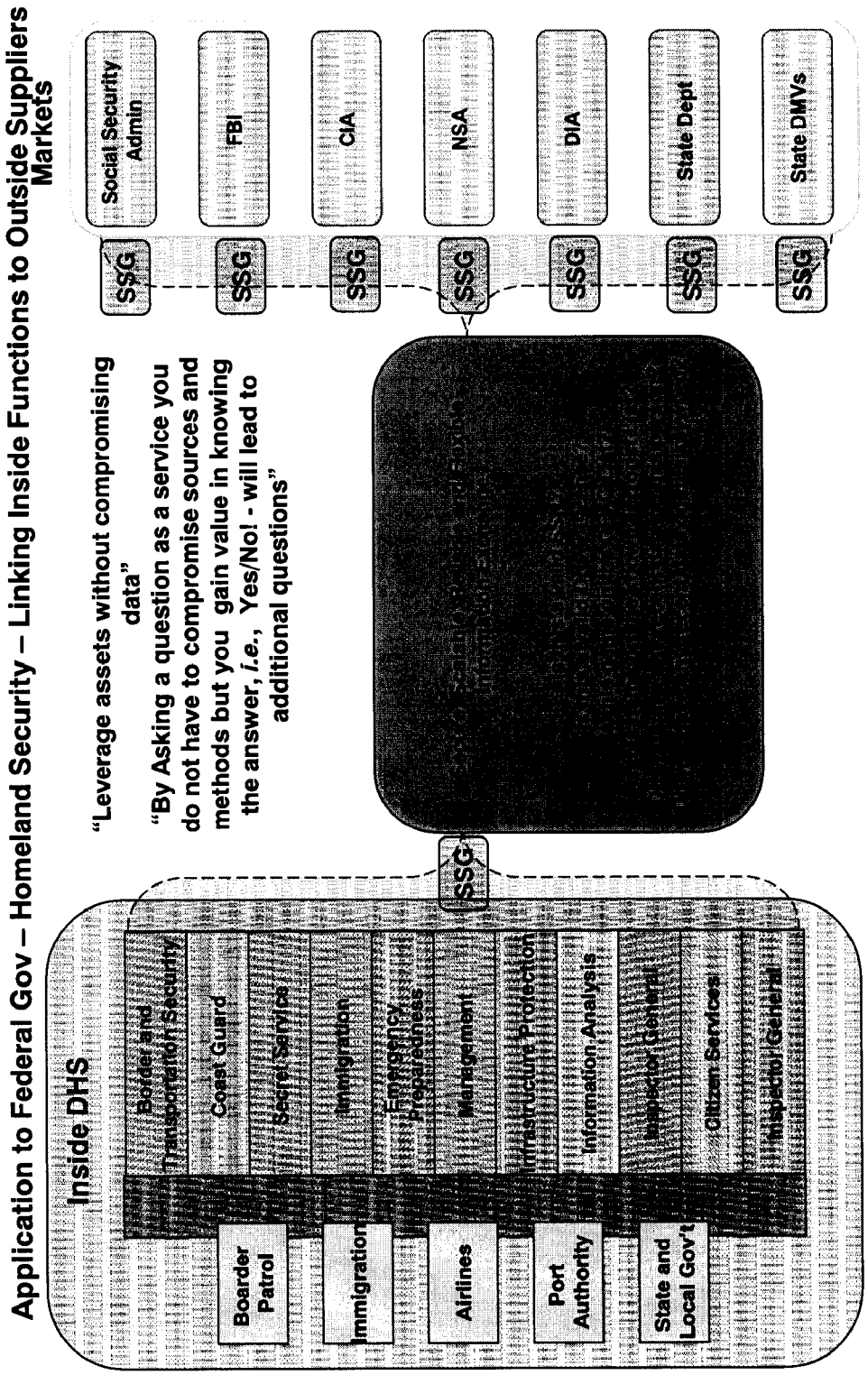
Figure 20, Managed Service Virtual Network Example – Federal Government

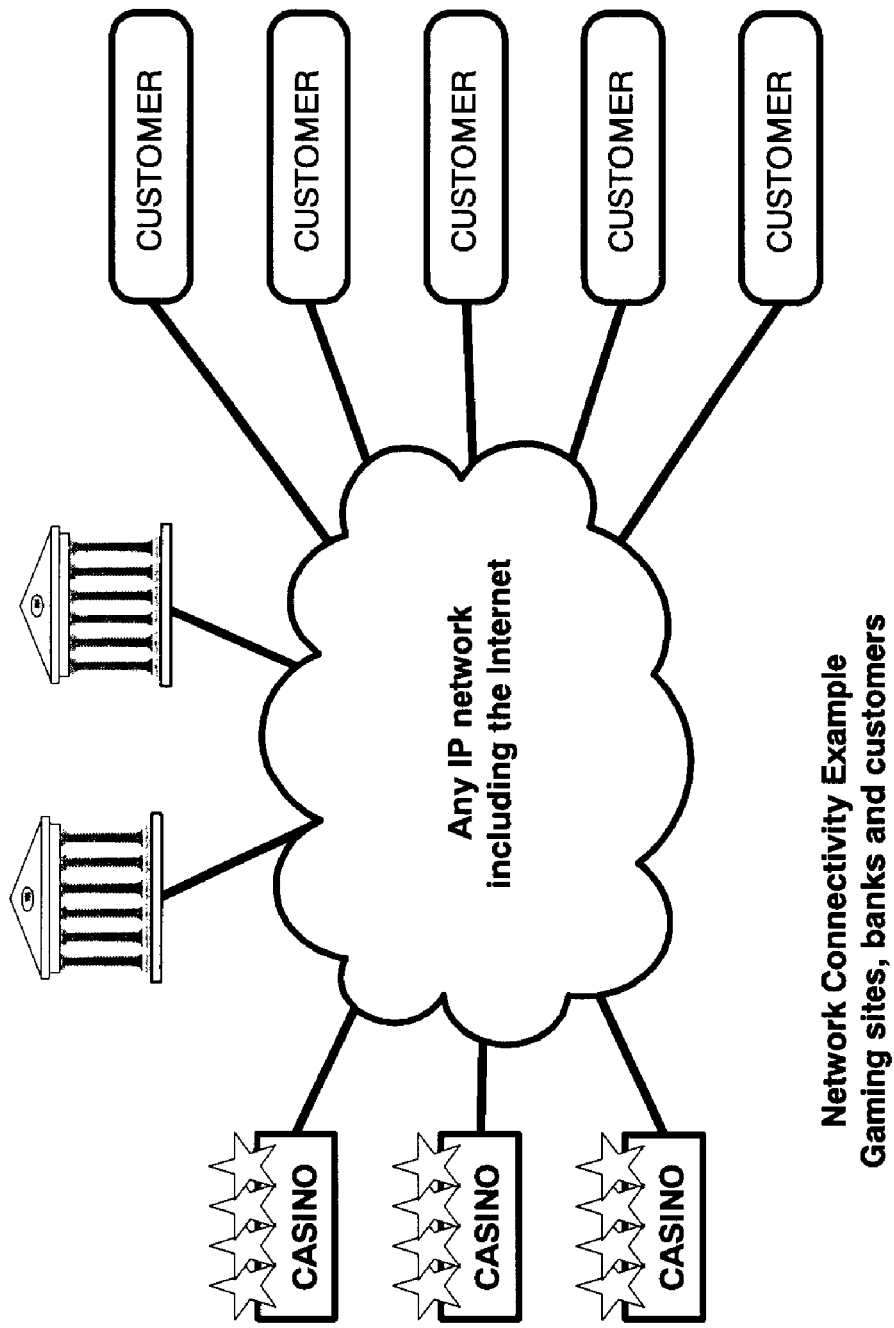
Figure 21, Managed Service Virtual Network Example – Banks, Gaming Sites and Customers

INFRASTRUCTURE ARCHITECTURE FOR SECURE NETWORK MANAGEMENT WITH PEER TO PEER FUNCTIONALITY

RELATED APPLICATIONS

This application is related to and claims all benefits under 35 U.S.C. sctn. 119(e) of our earlier U.S. Provisional Patent Application Ser. No. 60/694,456 filed Jun. 27, 2005, entitled "Service Oriented Network Managed Service Infrastructure and Process Model for Secure Networked Communications With Peer to Peer Functionality", now expired. This application is a continuation in part of our application Ser. No. 10/967,991 filed on Oct. 19, 2004, Secure Service Network and User Gateway; application Ser. No. 10/846,114 filed on May 15, 2004, End to End Check Processing From Capture to Settlement with Security and Quality Assurance, now abandoned; application Ser. No. 10/823,442 filed on Apr. 12, 2004, Quality Assured Secure and Coordinated Transmission of Separate Image and Data Records Representing a Transaction, now abandoned; application Ser. No. 10/459,694 filed on Jun. 11, 2003, Standardized Transmission and Exchange of Data with Security and Non-Repudiation Functions, now U.S. Pat. No. 7,568,222, issued Jul. 28, 2009; and application Ser. No. 10/283,038 filed on Oct. 25, 2002, Dialect Independent Multi-Dimensional Integrator Using a Normalized Language Platform and Secure Controlled Access, now U.S. Pat. No. 7,565,326 issued Jul. 21, 2009; all of which are incorporated herein by reference.

FIELD OF THE INVENTION

The present invention relates generally to secure electronic network communications using the Secure Service Network ("SSN") technology as described in, or similar secure network topology virtualization facility, layered on top of one or more physical network infrastructures and offered as a managed network architecture to a community of participants. The invention provides a network virtualization that includes comprehensive integrated security and business reporting, a distributed governance and process model, a family of remote management infrastructure services, and a set of implementation patterns, to arrive at a comprehensive managed network for the creation of an unlimited number of secure virtual network communities over any physical network infrastructure.

While the Internet and World Wide Web have become established as efficient and useful communications media, security breaches over public networks and vast private networks, and networked applications have been widely reported; spam, phishing, pharming and other scams and identity theft have tarnished the integrity of network based activity and reduced their attractiveness to potential users.

Current security approaches are based on a piecemeal mix of security elements inconsistently applied to the network and applications layers in a loosely interpreted Open Systems Interconnect (OSI) stack. This approach works fine in a closed environment where one can control all applications or one can implement a private dedicated function specific network using perimeter security. However, the industry is slowly realizing that this model does not scale in a shared, multi-user, multi-function, multi-application environment like that provided by vast private networks or the internet. The reason is that as the number of users and or applications grows so does risk and cost. The result is that security in a multi-user, multi application environment is only as good as the combination of your weakest perimeter device or weakest application using the network. The net result is that participants can be compromised by other participants either through poor applications or poor perimeter security. To date most approaches have been to develop a consortium that implements and centrally manages a private network through the establishment of dedicated function specific network connections. Both approaches have signification limitations.

These same approaches to security and the resulting characteristics are repeating themselves in the market with proposed piecemeal approaches to web services security. The invention addresses these issues by enabling the secure creation, provisioning, and consumption of web services as a function of a managed network architecture over one or more communities of users. The integrated security and business management reporting assures that a web network architecture provider can control the access and distribution of their web service independent of other participants and network transport provider. The ability to securely manage the creation, provisioning, business reporting, and consumption of web services across communities of users and independent of participants in that community is a unique feature of the invention. Currently there are many purposed approaches to the creation of web service communities. However, there are no offerings like the invention that deliver the comprehensive integrated security, management reporting, participant control, time to market, low cost, and flexibility provided by the invention.

The invention enables the creation of secure composite applications through the secure aggregation of web services from one or more participants. In the future applications may be the result of the aggregation of functions provided by web services and/or other applications. A need exists for the secure aggregation and orchestration of one or more web services from a community of providers. The managed network architecture, integrated security, management reporting, and governance features of the invention support this aggregation with end to end security and business management reporting while assuring that the provider of a service maintains absolute control over who can access that service private and independent of any other participant.

There is a need for a consistent security implementation and management infrastructure were secure business activities can be conducted in a reliable and auditable manner and where the participants can maintain absolute control over their data and applications using any physical network connection. The security market fragmentation and need for this functionality is reflected in a February 2005 Report to the President of the United States titled "Cyber Security: A Crisis of Prioritization" by the President's Information Technology Advisory Committee and included herein by reference.

The present invention provides a focused and managed secure virtual service oriented network that can be provided by any enterprise or community, such as a telephone company, a bank, an industry consortium, or other community having a common association requiring a multi-function secure network capability around a broad group of participants and one or more business activities. The managed network architecture of the invention allows participants to define, publish, provision, charge, manage, and consume business services in a secure and reliable manner using a secure virtual network topology over any physical network connection.

All activity on the managed network architecture inherits a unique comprehensive security, business reporting, and privacy model that can include 1) mutual authentication for participants accomplished by any one of or a mix of devices, services, users, and/or applications; 2) authorization, as based on one or more authentication protocols; 3) privacy; 4) end to end encryption; 5) end to end logging; 6) end to end audit; 7) non-repudiation, and other functions where each participant can define, create, provision, and manage an individual participant's services independent of any other participant on the network. The invention allows for the creation of an unlimited number of secure, private virtual communities over any mix of physical network infrastructure including public and private network connections as well as wired and wireless mediums.

Chains (as defined in our previously referenced related applications as relationship and control models and included herein by reference) of reporting, admin, and trust (comprehensive security) can be enforced, tracked, managed and reported on across many participants and many services where one service may call another service, etc., where the managed network architecture is independent of carrier; where a participants network control point can remain on the participants premise, behind their firewall and remote administration can be accomplished via secure management services over the virtual network, but access control can be enforced by the participant (customer of managed service) on their premises.

This capability eliminates the need for the management provider to own or have access to premise equipment (an example would be the Secure Service Gateway (SSG) as defined in previous art and included herein by reference). This approach is unique in the market and allows the participant to maintain absolute control of their data while allowing for an external managed service with a distributed governance. By combining a Secure Virtual Network capability with an operational governance model and network packaging, the result is a managed network service offering that is unique. This network architecture enables a network provider to create and manage one or more virtual network infrastructures on any physical network independent of carrier, network equipment provider or network owner. The invention enables participants to create, manage, provision, and report on network based services to any other participant on the network with absolute security, privacy, and independence from any other participant on a network.

BACKGROUND OF THE INVENTION

Today's technology and market has evolved with two distinct segments. One is around networking and traditional perimeter security, and the other is around applications and business functionality. The result is that there is a significant separation and variations in implementation of critical components of security across the layers of the OSI stack with no consistent integration for security and business reporting. The internet has done a great job of standardizing network connectivity, but does not address comprehensive security or business reporting. Everyone does it in their unique way and/or relies on the other for security. The result is businesses are driven to private application or function specific networks in order to guarantee security, reporting, and control. Combine this with the fact that the telecommunications and network equipment companies are focuses on selling bandwidth and equipment to earn a living and one can quickly see why the market and technology is so fragmented.

The result today is that networked application security is dependent on several critical elements that are not consistently implemented or managed as an aggregated network or system for a shared participant environment. Today, assuming multifunction networked security is only as good as the worst combination (weakest link) of implementation approaches whether it be in one of many applications using the network or in any elements of the perimeter security applied at the network perimeter, one of its segments, or in the applications using the network.

Current approaches to addressing these issues are focused on more complex versions of the same approaches. Examples include smarter perimeter devices like XML firewalls, payload inspection routers, and devices focused on content based filtering and routing. Users are forced to implement private dedicated networks that are application or function specific, point to point, and managed as islands of secure network infrastructure where a key element of the security approach is to limit activity or users through single or centralized control. These approaches are costly and severely limit participants on the network as well as networked applications. Examples include the many private and function specific networks in banking today (Visa, ACH, ATM, Fed Wire, etc.,) the traditional EDI implementations where point to point connections are used for EDI transmission between two parties, and the many networks used in the securities, insurance, medical, legal, and educational business verticals that perform limited functions and have a restricted participant base. There is no current architecture to accomplish security where disparate elements are implemented and enforced in a consistent manner independent of the network transport provider and/or applications attached to the network where each participant can maintain secure control of their network activity (services) independent of others on the network. For example, the telecommunications companies are stuck in the private network business with a slight move to a managed VPN model, and the network equipment providers are focused on selling more equipment. There is a need for a managed network architecture that addresses these issues independent of telecommunications provider and network equipment provider.

A need exists for a network that addresses the shortcomings in the current commonly accepted implementation models for security for applications that run over any OSI based network infrastructure at both the network and application layers. By integrating comprehensive security and reporting elements across the OSI stack into a virtual secure network offering one can arrive at a low cost, secure, multifunction, broad reach virtual network that addresses all of the elements needed to support a basic business contract on a shared multifunction network infrastructure that is currently not attainable with today's piecemeal and fragmented approaches.

No network exists today that combines the features of embedded comprehensive security, business reporting, low lost, flexibility, and governance that can be achieved with the invention. The invention supports any network protocol that is TCP friendly including streaming protocols and also provides architecture to secure the provisioning and use of web services over any network transport. The invention enables the creation of secure virtual network communities on any physical network where comprehensive end to end security and business reporting are functions of network communications and inclusive to all network traffic. By combining this capability with various governance and implementation models one can arrive at one or more network architecture offerings where a network provider establishes an infrastructure that enables the creation of participant driven and managed secure virtual network communities for conducting secure and manageable communication over any physical network including wired and wireless transmission mechanisms. This enables the creation of secure network communities of participants over existing private networks or any public network such as the internet.

SUMMARY OF THE INVENTION

The invention integrates network virtualization with comprehensive integrated security and business reporting, a distributed governance and process model, a family of remote management infrastructure services, and a set of implementation patterns, to arrive at a comprehensive managed network for the creation of an unlimited number of secure virtual network communities over any physical network infrastructure where service provider participants at a minimum, maintain absolute control over their services independent of any other participant on the virtual network.

The invention is unique in its combination of a secure virtual network topology manager that includes integrated and comprehensive security and management reporting (as defined in our previously referenced related applications and included herein by reference), a distributed governance model (as defined in our previously referenced related applications and included herein by reference), and a managed network architecture operational model as described herein.

The result is architecture and process framework that establishes a secure services virtual network topology on any network transport independent of carrier provider where chains of trust and business management reporting can be established and maintained across large diverse group(s) of participants.

The present invention establishes a technology that addresses the traditional separation between the interpretation and implementation of lower layers (commonly referred to as network or transport layers) of the OSI stack and upper layers (commonly referred to as the application layers) of the OSI stack. The invention addresses the separation and inherent flaws in the classic network perimeter model and mixed application model by implementing end to end comprehensive security as a function of a secure virtual network connection using a distributed governance and management reporting model. The invention does this in a fashion that is transparent to the applications/web services running over the managed network and the underlying transport, but is complimentary to existing security in the application/web service or in the network transport.

By establishing a layer on top of the traditional network transport that integrates a comprehensive security and management reporting capability the solution can assure that all network activity meets a minimum security and business reporting model.

Depending on the governance model (as described in our previously referenced related applications and included by reference herein) the network architecture provider can maintain absolute control over access to its services independent of any other participant on the network including the network provider. This is unique to the invention and the market and eliminates many political, control, liability, and technical obstacles that have hampered the creation of vast diverse secure communities of users in the past. Service requestors can request services provisioned to them by service providers. The network provider provides the virtual network infrastructure, management reporting, and governance enforcement enabling participant activities.

Participants can have multiple roles. For example for one service a participant might be a service requestor where with another service a participant might be a service provider. In addition the network provider may also provide and request services.

In one implementation, applications/web services utilize this layer for secure communication over any network transport by way of a Virtual Service Connection ("VSC") created and managed by the invention. All traffic inherits a base security model enforced by VSCs. Multiple VSCs are created as needed to create a Virtual Service Network ("VSN"). This allows for the creation and management of secure VSN and/or multiple VSN communities. VSCs are defined and created through service definitions in the invention and can vary in granularity based on a service providers need.

Unlike a VPN, where the result is an extension of network privileges and perimeter security where all traffic runs down the same virtual network connection, each service on the VSN runs down its own isolated and dedicated VSC where there may be one or more connections per node (SSG) or user on the VSN. The ability of a node or participant to support multiple concurrent secure VSCs on the network is a unique feature of the solution.

In one implementation, multiple VSCs are supported where each VSC includes mutual authentication, service specific authorization (function, application, web service, etc.,) transport encryption, and end to end reporting for each and every service and specific to the provisioning of that service to one or more users. Optionally payload encryption and digital signing of the payload is supported which can be specific to the provisioning of the service to one or more participants in that service. A VSC is specific to a service definition and the one or more participants a service is provisioned to. A discrete and private VSC is created for each service relationship as defined by a service provider on an instance of a VSN managed by the solution assuring absolute end to end security, privacy, and reporting independent and isolated from all other virtual or physical network traffic.

As an example in a preferred embodiment a VSC includes a mutually authentication SSL VPN connection with service and participant specific mutual authentication using PKI, activity specific authorization using PKI, end to end logging, encryption, and management reporting. Unique UIDs are created that allow for end to end logging, reporting and transitive security for the brokering and correlation of multiple requests and request origination. Unique request IDs, a correlation ID, and a origination ID are created and supported by the solution.

Encryption is supported in many forms but at the basic level two critical encryption concepts are supported. These two forms include (1) transport encryption that protects the information while in transit on the wire (mutually authentication SSL using a PKI framework is one implementation example), and (2) payload encryption (PKI encryption as one example, XML certificate based encryption as another) such that the payload is encrypted and protected while at rest and prior to being sent down the wire and after receipt by one or more recipient participants. In the case of (2) this approach can be used to provided several unique features that include one or more of the following: (1) recipient specific encryption (as an example this could include a PKI encryption scheme where the public key of the recipient is used to encrypt the data such that only the recipients private key can decrypt it), (2) protection of data while at rest since it is still encrypted before and after it is transmitted over the network, (3) digitally signed data such that one can guarantee who it came from and/or it was not tampered with.

The invention implements a secure VSN topology on any network transport where one or more management facilities are used to define, implement and manage VSCs through service definitions. In one implementation of the solution, this VSN topology is a virtual network implementation that includes Secure Service Gateways as management points and/or entry points on the VSN. VSN participants establish a trust relationship with other VSN network elements that are specific to a VSC. As a result, activity on the VSN is managed and enforced in a consistent but participant driven model. In this manner the solution embeds security, audit and reporting in the network where all service traffic on the network inherits this base infrastructure capability.

The benefits of the invention include all of the elements around secure and auditable information exchange discussed herein as well as the ability to deliver high value secure services over any network transport in one or more governance models.

This solution alleviates the need for a dedicated network drop for every network participant, business partner type, or high value application or business function and addresses the fragmented security issues inherent to current approaches. The network drop is replaced by a VSC which is a private virtual connection between one or more participants specific to the participants and the service where comprehensive security and reporting is implemented consistently and private to that VSC. The invention allows service providers to provide any number of isolated VSCs over any shared network transport including the internet, private networks, wired and wireless connections. In addition service providers can broker services (VSCs) to other participants while maintaining security and privacy with business reporting.

As a managed service, a network carrier can provide a broad range of applications, web services, business functions, and activities on the network where there is physical network connectivity while allowing the managed service to be independent of other carriers. In this manner one carrier can gain an advantage over another in a mixed carrier environment by establishing a network architecture on the other carrier's network transport. The same advantage applies to a network equipment provider. The solution enables VSCs and VSNs independent of the hardware implementing the traditional network transport and lower level network addressing and routing scheme. As a result a network equipment provider that includes the solution in their equipment has the ability to establish VSNs and VSCs on a mixed equipment network which reduces the value of a competitor's equipment while enhancing the value of their equipment.

In one example configuration of the invention a VSC is created specific to the activity and participants for that activity that is open for the duration of the activity and then disposed of. The VSC can be tied to a Service Definition where a Service Definition can be tied to business functions, applications, web services, admin functions, reporting functions, and the like. For example, a service definition may be a web service, can be a VSC specific to an existing web enabled application, can be a web service linked to a legacy application, business function, or business process, can be a web service linked to another web service and the like. In this manner the invention allows for the integration of many disparate systems into a secure comprehensive or simple service that can be universally and securely shared with anyone having access to the solution. The invention supports the brokering of services by allowing for the creation of chains of trust, audit, and business reporting. Supported chains of trust have been described in our previously referenced related applications and are included herein by reference.

The invention supports a broad range of service definitions that can be used to address simple and complex legacy system integration as well as multiple levels of network and application integration. This includes carrier diverse environments as well as a seamless transition to and from trusted and untrusted network transports. Using the invention, a network provider maintains the secure virtual network infrastructure that enables participants to create secure virtual network communities. These virtual network communities can traverse many physical networks enabling internet like connectivity but with the comprehensive security and business reporting needed to enter into and enforce a business contract.

The invention might be best described via an analogy. Let's use eBay as an example. eBay makes a business of managing an application to support online auctions. Sellers list items for sale and buyers consume items. One could state that eBay provides an online auction application as a managed service over the internet to enable buyers and sellers to conduct online auctions. Sellers can advertise and sell just about anything independent of anyone else as long as they abide by some basic rules that are enforced by the network provider, in this case eBay. eBay generates revenue by providing the online auction as a managed service to internet users. The eBay application includes some elements of security, management reporting, operational procedures, dispute resolutions, and the like. Participants agree to abide by the rules of the managed service as a condition for conducting business.

Much like eBay, the invention is a managed service but not a single application. The managed network architecture invention enables the creation, by participants, of vast secure and private virtual network communities where participants can publish and consume services in a reliable, safe, auditable, enforceable, and secure manner. The network provider provides the infrastructure and governance model where everyone operates within a set of enforceable rules and processes but maintains control of their assets. Instead of auctions, the network provider enables participants to securely create, publish, consume, provisioning, manage, and secure network communications for anything they wish to share. This could be an application, a web service, a family of web services, a embedded appliance, cell phone, smart phone, PDA, . . . etc. In this example, participants are service providers (sellers on eBay) or service requesters (buyers on eBay). The network provider is eBay. Using this model the network provider generates revenue from providing the service as well as advertising.

As a managed network architecture, the invention enables the creation of vast secure virtual network communities. This is done through a unique combination of security components, governance, network virtualization, management services, infrastructure services, and operational processes that is unlike anything else currently available.

This approach provides for significant advantages over current network approaches as described in our previously referenced related applications and discussed further below. It is independent of physical network path, it can be independent of physical network equipment, it is firewall friendly, it works on any carrier environment, it provides end to end security, it supports end to end management reporting, all traffic is specific to a VSC assuring privacy and security for that activity and specific to the provisioning of that activity to one or more participants, services can defined as just about anything using network communications (examples include: applications, web services, business functions, proxies to legacy applications, streaming data, VOIP, and the like), governance can be distributed to the participants such that they can maintain control of there services independent of anyone else.

BRIEF DESCRIPTION OF THE DRAWINGS

The following figures detail elements of the invention.

FIG. 1 reflects an example of the virtual network layer that supports a virtual network topology and network architecture over any physical network infrastructure. Layer 1 is the traditional physical network. Examples can include a typical packet switched IP network where switches, routers, hubs, and firewalls are used to effect network traffic management and routing based on packet filtering. Layer 2 reflects the virtual network infrastructure and topology for the solution as a managed network architecture layered on top of a physical network infrastructure. This could be any mix of public or private networks provided by one or more carriers. The virtual nature of the solution allows a carrier to provide a managed network architecture outside of their own physical facilities by leveraging public and private network connectivity with the invention. VSCs are reflected on this layer. This layer allows participants to establish end to end secure VSCs where comprehensive security and management reporting are functions of a connection and independent of applications and lower level physical network components. Layer 3 in this diagram reflects the actual business functions provisioned and managed by the network provider. This may include elements such as applications, web services, large corporate shared gateways, single user gateways, or just about anything that relies on networked communications to function. While layer 1 does not reflect this, the solution works over wired and wireless physical networks.

FIG. 2: Represents sample communities of participants that can be created and managed by the solution resulting in secure virtual network communities and Eco systems. In this example participants are service providers and service requesters using the network architecture. A unique feature of the solution is that an unlimited number of virtual communities can be created and managed on any physical network where participants maintain control and absolute security over their activities. This eliminates the technical, legal, and political barriers that are presented by other approaches such as consortiums and private managed networks.

FIG. 3: Reflects the fragmented elements of security and management reporting in the market today. In examples like the internet, elements are inconsistently applied to the network, users, and applications making it impossible to achieve a secure multi-function, multi-application, and multi-user environment. Current market approaches require either a dedicated private network, central control of all applications, or a consortium where participants relinquish security to a third party entity. In any case cost and control in addition to consistent security and management reporting are not scalable to large user communities without the invention.

FIG. 4: Reflects the integration and comprehensive elements provided and managed by the solution. This integration and comprehensiveness of the solution addresses the current fragmentation around security for network based communications. The managed network architecture of the solution integrates security, management reporting, and distributed governance for all participants and provides a secure mechanism for the secure distribution and consumption of network services.

FIG. 5: Reflects a new processing paradigm where applications are composed of one or more services on the network where one or more participants may own and managed the services but all activity is secure and specific to the services and the provisioning and consumption of services by participants allowing for end to end reporting and security even though services may be brokered and aggregated from multiple parties.

FIG. 6: Illustrates example implementation options for nodes on the network architecture where nodes may be large community gateways, gateways with users of 1, and a Global Gateway that houses the services for admin and management as well as a service repository used to create, manage and provision services to any participant on the managed service. In this example access to Billing and Management reporting systems for the managed service are also provided by the Global Gateway.

FIG. 7: Illustrate a simple implementation where service provider and service requestor participants and services are outlined as well as the infrastructure services used to administer and support participants. A GSSG is shown as an administration point on the virtual network. Gateways communicate with each other via a set of infrastructure functions and services that utilize the same comprehensive security as business services. As a result end to end security and reporting is included for the administration of most managed service activities. This diagram reflects Authentication, Service Authorization, Logging, Event tracking, Billing Analysis, PKI lifecycle services, End user Management and Provisioning, Node Management, ACL and CRL services, Certificate signing. Note the SSG on the network and the activities that are consistently implemented by each SSG. These include authentication, logging, Authorization, Encryption and Decryption. All services inherit this infrastructure to provide a consistent and comprehensive managed service.

FIG. 8: Sample illustration of a the cost and margin comparison of conventional private network solution vs the virtual network managed service invention. Costs are significantly reduced while enhancing security, management reporting, time to market, operational governance and compliance reporting, and flexibility.

FIG. 9: Sample illustration of the new revenue opportunities enabled by the invention over that provided by current traditional approaches. The virtual nature of the network architecture opportunity allows for significant revenue opportunities without significant capital investment.

FIG. 10: Sample illustration of the comparison between a traditional dedicated network connection vs the Virtual Service Connection supported by the network architecture. In the traditional model each application or function would require its own physical network connection in order to assure privacy, security and reporting among the participants. The invention enables discrete VSC for each application or function using the same physical network connection. This is a virtual provisioning process that significantly enhanced time to market and flexibility while providing enhanced comprehensive security and management reporting.

FIG. 11: Sample Management Console View—Service Listing. Listing of services available from the perspective of the Global Secure Service Gateway on a instance of the solution. The screen shows what is active, the service ID, the Service Description, Service Type, and Creation Date. Active service status can be turned on and off simply by clicking on a box next to the service.

FIG. 12: Sample Management Console View—Services Provided List. Listing of services provided by a participant. In this case, it is the GSSG. The screen shows what services are actively provided, the service ID, the Service Description, Service Type, and an Allow Entitlement Status. Provided service and allow entitlements can be adjusted by checking a box next to the service. This provides service and participant level granularity which enables the creation of a participant and service specific VSC as needed for each participant that a service is provisioned to on the virtual network.

Figure 13:
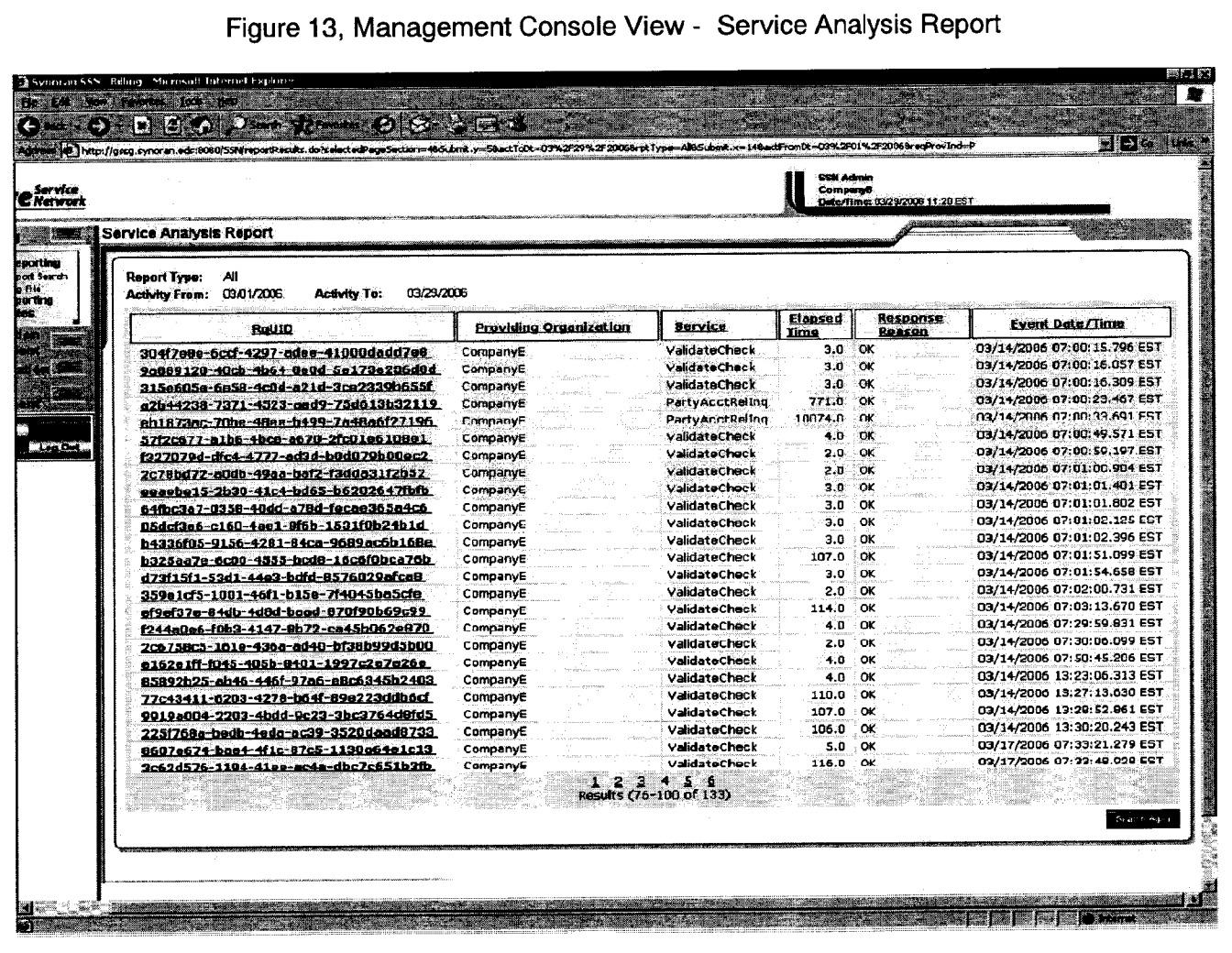

FIG. 13: Sample Management Console View—Services Analysis Report. A view of the service activity between participants on the network. Each service invocation creates a unique RqUID that is used to correlation activity across the virtual network. This activity is security aggregates across the network using the same secure infrastructure that services us.

The view details each RqUID, the providing organization (user or entity), the service, elapsed time, response reason, event data and time. Note to maintain privacy this report is specific to a participant. In this case the participant is Company B and the report reflects all services provided to Company B by Company E.

FIG. 14: Sample Management Console View—Audit Record Detail. This view provides additional detail from a specific RqUID on the previous view. In this case it is a detail record for a specific RqUID that includes: requesting organization, providing organization, service, response code, response reason, elapsed time, request size, response size, event data and time, service URL, Request UID, Origination UID, Correlation UID, local infrastructure ID, remote infrastructure ID, originator host, destination host, destination port. This information is captured for all activity managed by the invention and independent of the application or device making the request. A correlation ID allows for the aggregation of activity from multiple service requests. The origination ID allows for a programmer to populate a field with information specific to a device or activity interfacing to the virtual network.

FIG. 15: Sample Management Console View—Service Analysis Report—Elapsed Time. This view provides a report that can be used for SLA assessment. Note that ranges can be set and activity is specific to a service and the participants in that service. The operator can set date ranges in order to support period reporting.

FIG. 16: Sample Management Console View—Service Analysis Report—Request Size. This view provides a report that can be used for SLA assessment. Note that ranges can be set and activity is specific to a service and the participants in that service. The operator can set ranges in order to support period reporting and SLA reporting specific to a payload size. A similar reporting capability is provided for Response size. This level of reporting also supports the forecasting of bandwidth needs specific to a participant and one or more services.

FIG. 17: Sample Management Console View—Service Execution Fee Report. This view provides a fee report for the execution of services between participants allowing for the protection of participant and fee rate privacy. In this case the report reflects service provided to Company E by Company B. Company B could provide these same services to another participant at a different rate. The solution assures that Company E would never have access to that information and therefore protects the privacy of the business relationship specific to the provisioning of a service.

FIG. 18: Sample Management Console View—Security Proxy View. This view details the configuration of the security portion of a node on the virtual network managed by the solution. Organization information, network mapping information, and in the case of using PKI certificate status information and revocation is provided. Note that the Organization ID and Organization as well as serial number and status are provided. One important feature is the create package button. This allows the user to create a software package that results in a new node on the network architecture. This package can be downloaded to a suitable device. Once installed it registers with the managed service console, the console initializes it and provisions it as a participant on the network. This facilitates the enablement of an automated self enrollment process allowing for quick and simple additional of participants to the managed service and as a result virtual network communities.

FIG. 19: Managed Service Virtual Network Example: This figure provides and example of how a financial institution might use the solution to interact with customers and business partners through one or more virtual network communities. The financial institutions investment in current applications can be provisioned through the solution to arrive at a low cost secure model for sharing information in an auditable fashion that meets compliance needs with no or just minor changes to the existing applications.

FIG. 20: Managed Service Virtual Network Example—Federal Government: This figure provides and example of how the Department of Homeland Security might use the solution to interact with other government agencies to make time sensitive business decisions while assuring the control and protection of data in those external systems with their owners. In addition, this example reflects how one might use a service as a proxy to a legacy system. In manner the service is the only access path to the legacy system and therefore the service can eliminate the need to share actual data by simply asking a qualifying question. Avoid Privacy, political and competitive Issues by Giving a Yes/No or Score Card Reply rather than specific details. Sample questions are listed in the figure and below. Is this a valid ID? Passport . . . etc? Is this a valid SSN#? Is this a valid Address? Is this name on the OFAC List? Is this name on a Terrorist List? Real time end to end audit of activities, Do you have any recent information on this name? Is this person on one of the watch lists? Is this a person that you would like to detain? By asking simple questions and providing simple answers the DHS can do a much better job and not compromise data repositories, sources and methods.

FIG. 21: Example Secure Virtual Network Community—Customers, Banks, and Gaming Sites. This figure provides an example of secure community of participants where a private secure virtual network is created to facility secure network activity between banks, customer, and gaming sites. Connections could be accomplished over the internet and facilitate the real time settlement and clearing of gaming activity. In addition, with the use of geo-positioning information supported by the managed network online gaming can be managed to meet the regulatory needs of knowing the location of the gamer.

DETAILED DESCRIPTION OF THE INVENTION

A managed network is described enabling the creation of secure virtual network communities (two or more participants) where comprehensive security and business management reporting is a result of the network architecture and where participants can maintain absolute control over their services independent of any other participant through one or more distributed governance models as described in our previously referenced related applications and included herein by reference.

The invention is the result of the architectural integration of network virtualization with comprehensive integrated security and business reporting, a distributed governance and process model, a family of remote management infrastructure services, and a set of implementation patterns, to arrive at a comprehensive managed network for the creation of an unlimited number of secure virtual network communities over any physical network infrastructure where service provider participants at a minimum, maintain absolute control over access to their services independent of any other participant on the virtual network.

The network architecture includes a virtual network topology manager comprised of a domain model that implements comprehensive security and business reporting for all activity on the network, a service repository, a management console, and virtual network gateways. The network provider manages the distributed elements of the solution through a family of services that it provides and can interact with the network gateways. As a result, all traffic on the solution inherits a comprehensive security and management reporting capability. This includes business services as well as management and infrastructure services. Examples of infrastructure services are outlined in the table below. In a preferred embodiment of the solution a family of services around the administration of digital certificates and the PKI lifecycle are used. Several examples services are provided in the table. In this embodiment the cost of digital certificates and PKI is significantly reduced while enhancing the elements of security that PKI and Digital Certificates can be used for.

munications, server to client communications, enables secure remote admin, enables secure reporting to a 3rd party for compliance needs, enables secure and auditable maintenance from a trusted and verified 3rd party. 2) For a smart phone or wireless device: The invention enables secure transmission of data to and from a participant independent of physical path. Can use for secure remote admin and maintenance, can use for secure and auditable content management and distribution, can ensure secure transactions in support of micro payments allowing real time communication with the service provider, bank or account holder, merchant, through settle-

| Service Name | Service Description | Base | Secure Digital Courier | End User Mutual Authentication | Discovery |
|---|---|---|---|---|---|
| ACL | Access Control List For Providing Authorization Information to Secure Services Gateway | X | | | |
| CRL | Certificate Revocation List - Part of the PKI Life Cycle, used by SSG's | X | | | |
| CertificateSigning | Certificate Signing - Part of PKI Life Cycle, used by SSG's and End User Authentication | X | | | |
| Directory | Directory Service - Provides Lists of 'Users' of the system and their public keys. | | X | | |
| FileTransfer | File Transfer | | X | | |
| SecureToken | Client Service of the Mutual Authentication Package | | X | X | |
| SecureTokenValidation | Integration Service for the Mutual Authentication Package | | X | X | |
| Logging | Used to register Audit Log Events to the Management Facility for Analysis | X | X | X | |
| UserMgmt | SDC user profile/passwd management | | X | | |
| UserActions | SDC user actions such as invite/accept invitations | | X | X | |
| Fact Service | Service Used to Verify a Fact for Challenge/Response Authentication | | | X (Optional) | |
| Domain Name Suggestion | Provides Language Based Analysis on Names based upon dictionary analysis of existing registered names. | | | | X |

The utility value of the solution can be achieved in any industry needing secure and auditable information exchange. By creating a set of base family of utility services a service provider may establish a common community for those services in one or more industry or industry segments. The service provider or other participants can create their own bundles of services and offer them to a broad community of users securely through the network architecture. Usage of the services can be monitored and tracked for billing and management needs. This may include a metered consumption based model where there is a fee for each use of the service or an all you can consume model for a set fee. SLA reporting around response time, payload size and status is captured and available for every service request.

The virtual nature of the solution allows for a great deal of flexibility over traditional physical solutions. For example a virtual node (example: a Secure Service Gateway as described in our referenced prior applications) can be and add to or embedded in applications, appliances, operating systems, browser, smart phone, smart card or token, or just about anything that supports or used a device for networked communications. These items could be loaded with a virtual node and once attached to a network or internet connection can leverage the infrastructure and management services of the network architecture to initialize and enroll in one or more virtual network communities. The enrollment process allows the node to authenticate and initialize to the network architecture and to request or provide services to participants in one or more virtual communities. The invention allows a user to leverage a current internet or network connection and allows the creation of an unlimited number of secure communities over any physical network connection.

Example uses include: 1) For an operating system: The invention allows secure and auditable server to server comment and clearing. Provides a secure virtual infrastructure for content management and distribution in support of a pay per use or pay per service content model like that in use today around ring tone and music downloads but with end to end audit ability, security, and management reporting. Provides a mechanism where providers can securely broker and securely aggregate services to participants where privacy, security and management reporting is included for all activity and independent of physical network path. 3) For an appliance: A sample appliance configuration might be a Cable, DSL, or set top box capable of running the virtual node software. The node would register with the network architecture and support an unlimited number of secure virtual communities. Communities might include digital entertainment (i.e., music and movies), banking, merchant services, access to a service such as Secure Digital Courier, Digital Safety Deposit Box, Digital Notary . . . etc.

Utility and value in the invention can be achieved in any industry needing secure information, energy, transportation, finance and banking, medical, legal, etc., sharing across any transport medium, and among other examples, cable television access and digital entertainment media.

Sample utility services include: A Digital Safety Deposit Box for data as described below wherein UC represents a programmed user command: (1) UC: Deposit Item—The User selects an item for deposit. The client app or service encodes and signs the item. A Deposit Item service securely transmits the item to the Service Provider on the network. The Service Provider verifies the item signature, stores the item, and optionally generates a receipt. The service securely transmits the receipt to the User; (2) UC: Retrieve Item—The User selects an item receipt or a discovery service which results in a menu of items available for recovery. The service securely transmits the receipt or the menu selected item to the participant. The service retrieves the item. A service securely transmits the item to the Client. The Client app verifies the item signature, and prompts the User to save the item.

In a File Transfer example, a participant can move a file from one participant to another; verify User/Participant identity for accessing the file; receive a notation that someone received the file; digitally sign the file or payload to assure Tamper Resistance; Encrypt the payload specific to a recipient prior to transmission; and encrypt and sign the payload prior to transmission. The service specifies who can access and open the file and encryption using a PKI infrastructure assures that only the intended recipient can ever open the file. In one instance of the solution, a key feature is the management of the PKI lifecycle through a family of infrastructure services and management functions maintained and administered in a management facility.

Identity Validation Service: A particular credential and validating service that validates one or more credential(s) across various identity sources such as DMV, Biometrics repository, etc. In a payments example, the invention enables secure, quality controlled transaction processing providing an audit trail and other useful features for security and clearing and settlement of documents imaged at a capture site. For example, the a system in one example may image a physical document and create a digital representation which can be broken up into several elements or data files that are digitally signed and securely transmitted over a network wherein the elements can be reassembled in a manner such that the integrity of the original document captured can be guaranteed after reassembly. An audit chain for tracing routes in the transmission of, and access to, the document files is also provided.

Authentication Repository Service: A library of valid credentials that can be validated via a service over the invention. The service in combination with the library provides for an adaptive approach to authentication where factors such as the location the request is coming from, the type of request, the value of the activity, the risk profile of the activity, the device making the request, and the credential presented can be factored into the authentication process.

Registered Digital Document Delivery: A user submits a document to a third party service. The service identifies individuals entitled to access document and provides notification (passive or active) of who accessed the document and the time of access.

For a Notary Service, some form of witness to the identification is generated and, in turn, a signature for that point and time, Using an identity service is generated and recorded specific to the activity and participants in that activity.

In File Transfer Cases, the architecture for the user is to Move the file, Sign File and move it, Sign file, Encrypt, Move the file with SSG PKI, Sign file Encrypt, Move the file with additional PKI on top of a VSN or VSC.

In the invention, each activity (as defined by the participant in a service definition) on the network is isolated, private, secure, and tracked independent of any other activity on the network even though the actual data may or may not be moving over a common physical medium (wire, wireless, Ethernet, fiber, etc.) A chain of reporting, admin, and trust (Security) can be tacked, managed and reporting on across many participants and many services. where one service may call another service, etc., Where the network architecture is independent of carrier; Where the SSG can remain on the participants premise, behind their firewall and remote administration can be accomplished via secure management services that are published to a 3rd party network provider, but access control can be enforced by the customer on their premises. This approach eliminates the need for the management provider to own or have complete and absolute access to the SSG. This approach is unique in the market and allows the user of the SSG to maintain absolute control of their data while allowing for an external managed network solution for a broad community of SSN participants. With current security models the SSG would need to reside on the network provider side of a customer's firewall. While this is supported, the ability to manage an SSG located behind a customers firewall with all of the security and reporting infrastructure inherent to a service is unique in the market. Other approaches require 2 firewalls or general port openings in existing firewalls, where there is no or limited participant context. The Unique SNN design allows a network provider to offer many levels of managed service support through the same management facility and on any IP infrastructure.

Implementation examples include the case where the participant wants the manager of the network architecture to include managing their firewall or an SSG outside of their firewall. This supports 3 general managed service processes: 1) SSG located behind participant controlled firewall but managed remotely by a third party where the participant controls access to the management of the SSG via service and ACL enforcement. 2) SSG located outside the participants firewall and remotely managed. In this case the Participant can allow the network provider to admin all of its services and has limited direct control. However the participant can optionally see operational and summary activity reporting and data in near real time. 3) SSG is located inside the participants firewall where the firewall and the SSG are managed by the 3rd party network provider.

In the invention, each activity (as defined by the participant in a service definition) on the network is isolated, private, secure, and tracked independent of any other activity on the network even though the actual data may or may not be moving over a common physical medium (wire, wireless, Ethernet, fiber, etc.). A chain of reporting, administration, and trust (security) can be tacked, managed and reporting on across many participants and many services. where one service may call another service, etc., where the management of the network architecture is independent of carrier; where the SSG can remain on the participant's premise, behind their firewall and remote administration can be accomplished via secure management services that are published to a third party network provider, but access control can be enforced by the customer on their premises. This approach eliminates the need for the management provider to own or have complete and absolute access to the SSG. This approach is unique in the market and allows the user of the SSG to maintain absolute control of their data while allowing for an external managed network solution for a broad community of SSN participants. With current security models the SSG would need to reside on the network provider side of a customer's firewall. While this is supported, the ability to manage an SSG located behind a customer's firewall with all of the security and reporting infrastructure inherent to a service is unique in the market. Other approaches require two firewalls or general port openings in existing firewalls, where there is no or limited participant context. The unique SNN design allows a network provider to offer many levels of management of the network architecture support through the same management facility and on any IP infrastructure.

Implementation examples include the case where the participant wants the management of the network architecture to include managing their firewall or an SSG outside of their firewall. This supports three general managed service processes: 1) SSG located behind participant controlled firewall but managed remotely by a third party where the participant controls access to the management of the SSG via service and ACL enforcement. 2) SSG located outside the participant's firewall and remotely managed. In this case the participant can allow the network provider to administer all of its services and has limited direct control. However, the participant can optionally see operational and summary activity reporting and data in near real time. 3) SSG is located inside the participant's firewall where the firewall and the SSG are managed by the third party network provider.

Implementation as a manager of the network architecture may include and installation kit much like that of a CD, a DSL or cable modem, or an appliance type device. It may be as simple as a software provisioning process or a browser add on. The network provider can install this independent or dependent on carrier and provisions it from an SSN management facility. The SSG supports installation on a carrier that is not owned or managed by the network provider. This allows a business entity like a telecommunications provider to provide significant services and business value independent of the carrier transport owner or provider.

The SSG can be packaged and deployed on commodity hardware, shared or dedicated hardware, and custom hardware. Commodity hardware may include existing PCs and servers, clusters of servers and wireless devices including cell phones and PDAs. The management facility allows the network provider to provision and manage a network of SSGs (participants) on a network where the provider does not have to own or manage the transport. The management facility and the SSGs allow network provider to provision, report, manage and operation the solution. In addition, it allows the provisioning of services and secure relationships across any number of participants. The GSSG and SSGs establish the infrastructure that allows for the creation, management and operational reporting for all services running on the SSN. It establishes enforces the security in terms of a virtual service connection directly between any group of participants that is defined by a service definition and unique and private to a service provider defined relationship as follows: 1) Virtual Service Connection—A secure point to point virtual network connection that is unique and specific to the service definition. It includes mutual authentication of all participants, function specific access control, encryption, logging, non repudiation, privacy, and the ability to map to security elements of existing systems and participants that may integrate or call an SSN service. 2) Service Definition—Service provided by one or more network participants where the network participant can define, publish, and provision who may have Secure access to that service independent of any other participant on the network. 3) Service Repository—a repository where services and service relationships may be created, provisioned, distributed, and maintained.

Key features and benefits of the invention are 1) Ability to secure function specific activity on any IP transport for the duration of the activity, allowing a value added secure managed service on a carrier diverse transport including the last mile and even down to the end user on wireless devices. 2) Eliminates the need for dedicated application specific networks. With SSN, applications/functions in the old world are service definitions in the SSN world. Each service is secured and executed in a virtual service connection that is secure and independent of all other activity on the network. This allows participants to create and distribute business value independent of anyone else on the network. 3) The solution builds on key artifacts already in place at most Companies including Network Transport, Carrier Telco Contracts, Internet Connectivity, Application and Network Security, and Existing Applications. 4) Implements all of the security and audit elements needed to enter into and enforce a basic business contract as an embedded function of the network. All service connections on the network inherit a common secure infrastructure encompassing the transport and application for all SSN activity making business contracts simple to report on and easy to enforce. 5) The solution is in alignment with the market convergence around networks and applications and enhances web services and service oriented architecture efforts. 6) Facilitates the integration of legacy applications and the secure management of their functionality to a broad consumer base that is not possible with other approaches. 7) Establishes a low cost, high margin, business model for an infinite number of services that is not possible with current market technology. 8) The solution creates a self promoting viral marketing position in which time to market, high margin, low cost, flexibility, compliance reporting, new service creation, consumption based billing are all inherent business drivers that are not enabled by any other solution in the market. 9) The solution establishes an absolute security model and demark point where a provider can guarantee and report on absolute security for any network service connection defined by SSN running on a diverse multi-carrier infrastructure including the internet. 10) The solution allows a network architecture independent of transport. 11) Securely Share Information without Compromising Sources and Methods and without violating Privacy. 12) Protects assets and control while allowing the sharing of mission and time critical information in a secure and auditable fashion. 13) Data owner maintains absolute control over their data independent of any other network participant. 14) No need to send a copy of your data or data bases. 16) No need to proxy security administration to third party. 17) Eliminates barriers to sharing information of a political or technical nature. 18) Simple integration to new and legacy systems. 19) Legacy to web applications and web services. 20) Absolute security, privacy, and audit trail embedded in the solution. 21) Mutual authentication, encryption, digital signatures, function specific authorization, privacy, end to end logging, non repudiation, usage based billing, SLA reporting. 22) Each participant maintains absolute control over access to their services. The SSGs and GSSG may be either hardware or software implemented in servers and server clusters, desktops, laptops, wireless devices, browsers and the like. See our co-pending applications referenced above all of which are incorporated by reference herein.

FIG. 1 shows a layer model wherein the layers correspond to: Layer 3—Participant business services. Layer 2—SSN managed services infrastructure and services. Layer 1—transport facility (any network). Utility and value in the invention can be achieved in any industry needing secure information, energy, transportation, finance and banking, medical, legal, etc., sharing across any transport medium, and among other examples, cable television access and digital entertainment media. A safety deposit box for data is described below wherein UC represents a programmed user command: (1) UC: Deposit Item—The user selects an item for deposit. The client application or SSN service encodes and signs the item. The SSN deposit Item service securely transmits the item to the service provider on the network. The service provider verifies the item signature, stores the item, and optionally generates a receipt. SSN securely transmits the receipt to the User; (2) UC: Retrieve Item—The user selects an item receipt or a discovery service which results in a menus of items available for recovery. The SSN service securely transmits the receipt or the menu selected item to the participant. The service retrieves the item. SSN securely transmits the item to the client. The client application verifies the item signature, and prompts the user to save the item.

In a file transfer example, a participant can move a file from one SSG to another SSG with or without user level authentication; verify user/participant identity for accessing the file; receive a notation that someone received the file; digitally sign the file or payload to assure tamper resistance; encrypt the payload prior to transmission; and encrypt and sign the payload prior to transmission. The service specifies who can access and open the file. For identity validation the invention enables secure, quality controlled transaction processing providing an audit trail and other useful features for security and clearing and settlement of documents imaged at a capture site. For example, the system in one example may image a physical document and create a digital representation which can be broken up into several elements or data files that are digitally signed and securely transmitted over a network wherein the elements can be reassembled in a manner such that the integrity of the original document captured can be guaranteed after reassembly. An audit chain for tracing routes in the transmission of, and access to, the document files is also provided. A particular credential and validating across various identity sources such as DMV, biometrics repository, etc. may be incorporated. Registered digital document delivery is a further example. The user submits a document to a third party service. Identifies individuals entitled to access document and provide notification (passive or active) of who accessed the document and the time of access. For a notary service, some form of witness to the identification is generated and, in turn, a signature for that point and time using an identity service is generated and recorded. In file transfer cases, the architecture for the user is to move the file, sign file and move it, sign file, encrypt, move the file with SSG PKI, sign file encrypt, move the file with additional PKI on top of SSN.

Using a given family of PKI services, the PKI will support s/mime with an email client for secure email, for example, a merchant, such as FedEx Kinko's, may, using the invention herein, offer a digital document delivery service from their locations; for example, with use for legal electronic document distribution. The invention allows a self selected group having a common community of interest in any subject or service to create and establish a secure network down to a peer to peer participant level at which services may be accessed and published.

The depictions of actual screens in the drawings, further explain the benefits and achievements of the invention for the Department of Homeland Security, sample DHS services using a Secure Service Network include:

ID Verification: 1) Real time confirmation of information on an individual, company, or entity based on credential presented or other search artifacts—Create On-We communities of information sharing that do not risk compromising data owner or methods but support War on Terror operations. 2) Answer to a question—Yes/No, Risk Score . . . etc., follow up question . . . .

Alert Distribution: 1) Real time secure dissemination of Information. 2) End to end knowledge of who and where. 3) Verification of Receipt.

Identity Management: 1) Manage historical patterns for stronger validation. 2) Offer a new repository for identity verification. 3) Avoid Privacy, political and competitive Issues by Giving a Yes/No or Score Card Reply. 4) Go to any one of many existing repositories—no need to replicate data.

Secure Inquire Services: 1) Is this a valid ID? Passport . . . etc? 2) Is this a valid SSN#? 3) Is this a valid Address? 4) Is this name on the OFAC List? 5) Is this name on a Terrorist List? 6) Real time end to end audit of activities. 7) Privacy of provider can be protected. 8) Data owner controls dissemination.

Intelligence Agencies: 1) Do you have any recent information on this name? 2) Is this person on one of the watch lists? 3) Is this a person that you would like detained? 4) By asking simple questions and providing simple answers the DHS can do a much better job and not compromise data repositories, sources and methods, . . . etc., at any of our national intelligence organization.

A Secure Service Network is comprised of: 1) One or more Organizations, Parties, or Participants that provide services. 2) One or more Organizations, Parties, or Participants that consume services. 3) One or more Services. 4) One or more Parties that Manage Organizations. 5) One or more Parties that Manage Services.

An organization is an entity in the Secure Service Network that is a possible provider and/or consumer of one or more services. An organization Is comprised of: 1) Organization ID. 2) Name. 3) Member As Of Date. 4) Status. 5) Contact Information. And is uniquely identified by an organization ID (supporting one or more individuals).

A service refers to a web service or web application to be provided within the Secure Service Network. A service contains a single definition within the Secure Service Network that describes the inputs and outputs of the function. A service is comprised of: 1) Service ID. 2) URL Path. 3) Description. 4) Creation Date. 5) Status. 6) Implementation Detail. 7) WSDL. 8) Schema. 9) Client WAR. 10) ServerWar, and is uniquely identified by a Service ID.

A provided service refers to a service that an organization fulfills through the Secure Service Network. An organization can prevent new entitlements to a service by setting the prevent new entitlement indicator. A provided service is comprised of: 1) Organization ID. 2) Service ID. 3) Prevent New Entitlement Indicator. 4) Status, and is uniquely identified by Organization ID and Service ID.

Service entitlement specifies a provided service of an organization that can be requested by another organization within the Secure Service Network. A service entitlement is comprised of: 1) Provided Service. 2) Providing Organization ID. 3) Service ID. 4) Requestor Organization ID. 5) Status, and is uniquely identified by Providing Organization ID, Service ID, and Requesting Organization ID.

A certificate is an electronic document used for security purposes. Within the Secure Service Network, a certificate is used for authenticating a Security Proxy. A certificate is associated to exactly one security proxy. An active security proxy must have exactly one active certificate in order to be an active service gateway within the Secure Service Network. A certificate is comprised of: 1) Serial Number. 2) Host Name. 3) Organization ID. 4) Status. 5) Certificate, and is uniquely identified by Serial Number.

A security proxy refers to the gateway component of an SSG. On inbound requests, it is responsible for certificate validation (authentication), and authorization. On outbound requests, it is responsible for providing the certificate for authentication and authorization by the receiving security proxy. The security proxy listens for inbound service requests and routes them to an internal service interface endpoint. The security proxy routes outbound service requests to the destination security proxy. An organization has one or more security proxies for handling service requests. A security proxy is comprised of host name, organization ID, status, and certificate, and is uniquely identified by host name.

A service interface endpoint refers to the location on the internal network that handles the service request after authentication and authorization validations have been processed by the security proxy. An organization has one or more service interface endpoints for each of its provided services. Service interface endpoint is comprised of: 1) Provided Service (Service ID and Organization ID. 3) Host name/IP Address. 4) Port. 5) URL Path. 6) Status, and is uniquely identified by Organization ID, Service ID, Host name, Port, URL Path The proxy service interface indicates the service interface endpoint that a security proxy routes service requests to. There must be exactly one service interface endpoint configured for each service that a security proxy will route service requests to. A service interface endpoint may receive service requests by zero or more security proxies. The proxy service interface is comprised of: 1) Provided Service (Service ID and Organization ID). 2) Security Proxy (Host name). 3) Service Interface Endpoint (Hostname, Port, URLPath). 4) Status, and is uniquely identified by Organization ID, Service ID, Service Interface Endpoint (Host name, Port, URLPath) and Security Proxy Host name.

A party refers to an individual or person that interacts or manages with organizations and services. A party authenticates to a system and is authorized according to their role and organization that they are a member of. Parties may authenticate and be authorized to manage other components of the network. Parties may authenticate and be authorized to use services on the network. A party Is comprised of: 1) Party ID. 2) Organization ID. 3) First Name. 4) Last Name. 5) Middle initial. 6) Status, and Is uniquely identified by Party ID.

An individual user may authenticate through a service definition on the SSN. The service may leverage a network repository of users or one or more repositories provided by a participant on the network. In this manner a authentication and/or authorization service can be provided that leverages current credential repositories. In addition, one or more services can switch among a wide range of repositories based on the credential that is presented, the device the request is coming from, the organization that the request is coming, and/or the request. In this manner the solution supports legacy security systems, new security systems, and advanced functionality to include biometrics. The ability to switch among many existing security repositories is significant benefit of the solution because it eliminated replication of data as well as the provisioning of control to a third party.

The invention supports a secure private peer to peer business communications model across any transport. This is accomplished by allowing service providers to create, implement and provision Services unique to them and their defined relationships. The ability for a service provider to maintain complete control over an access control list specific to the services and relationships they provide enables this peer to peer functionality. This is accomplished via one or more variations in the base governance model and is implemented by providing a unique ACL to any service provider that desires this capability. By doing this, a participant driven business model is achieved that allows any service provider to create, implement, and provision services independent of any other participant on the network. This allows the a service provider to maintain absolute control over their data and services as well as who can consume them and how a participants is charged for consuming them.

In the organization status cannot be set to Inactive if Active Provided Services exist; status cannot be set to Inactive if Active Service Entitlements exist; cannot be deleted if the status is not Inactive; cannot be deleted if there are Service Events; cannot be deleted if there are Provided Services; cannot be deleted if there are Service Entitlements.

In a service status cannot be set to Inactive if Active Provided Services exist; cannot be deleted if the status is not Inactive; cannot be deleted if there are Service Events; cannot be deleted if there are Provided Services.

A provided service cannot be added if the Organization Status is not Active; cannot be added if the Service Status is not Active; status cannot be set to Active if the Service Status is not Active; status cannot be set to Active if the Organization Status is not Active; status cannot be set to Inactive if there are Active Service Entitlements; cannot be deleted if the status is not Inactive; cannot be deleted if there are Service Events; cannot be deleted if there are Service Entitlements.

A service entitlement cannot be added if the Providing Organization Status is not Active; cannot be added if the Requesting Organization Status is not Active; cannot be added if the Service Status is not Active; status cannot be set to Active if the Providing Organization Status is not Active; status cannot be set to Active if the Requesting Organization Status is not Active; status cannot be set to Active if the Service Status is not Active.

Implementation as a managed service may include and installation kit much like that of a CD, a DSL or cable modem, or an appliance type device. It may be as simple as a software provisioning process or a browser add on. The network provider can install this independent or dependent on carrier and provisions it from an SSN management facility. The SSG supports installation on a carrier that is not owned or managed by the network provider. This allows a business entity like a telecommunications provider to provide significant services and business value independent of the carrier transport owner or provider.

The SSG can be packaged and deployed on commodity hardware, shared or dedicated hardware, and custom hardware. Commodity hardware may include existing PCs and servers, clusters of servers and wireless devices including cell phones and PDAs. The management facility allows the network provider to provision and manage a network of SSGs (participants) on a network where the provider does not have to own or manage the transport. The management facility and the SSGs allow network provider to provision, report, manage and operation the solution. In addition it allows the provisioning of services and secure relationships across any number of participants. The GSSG and SSGs establish the infrastructure that allows for the creation, management and operational reporting for all Services running on the SSN. It establishes enforces the security in terms of a virtual service connection directly between any group of participants that is defined by a service definition and unique and private to a service provider defined relationship as follows: 1) Virtual Service Connection—A secure point to point virtual network connection that is unique and specific to the service definition. It includes mutual authentication of all participants, function specific access control, encryption, logging, non repudiation, privacy, and the ability to map to security elements of existing systems and participants that may integrate or call an SSN service. 2) Service Definition—Service provided by one or more network participants where the network participant can define, publish, and provision who may have Secure access to that service independent of any other participant on the network. 3) Service Repository—a repository where services and service relationships may be created, provisioned, distributed, and maintained.

Features and Benefits of the invention include: 1) Ability to secure function specific activity on any IP transport for the duration of the activity, allowing a value added secure managed service on a carrier diverse transport including the last mile and even down to the end user on wireless devices. 2)

Eliminates the need for Dedicated application specific networks. With SSN, Applications/Functions in the old world are service definitions in the SSN world. Each service is secured and executed in a virtual service connection that is secure and independent of all other activity on the network. This allows Participants to Create and Distribute business value independent of anyone else on the network. 3) The solution builds on key artifacts already in place at most Companies including Network Transport, Carrier Telco Contracts, Internet Connectivity, Application and Network Security, and Existing Applications. 4) Implements all of the security and audit elements needed to enter into and enforce a basic business contract as an embedded function of the network. All service connections on the network inherit a common secure infrastructure encompassing the transport and application for all SSN activity making business contracts simple to report on and easy to enforce. 5) The solution is in alignment with the Market Convergence around Networks and Applications and enhances Web Services and Service Oriented Architecture Efforts. 6) Facilitates the integration of legacy applications and the secure management of their functionality to a broad consumer base that is not possible with other approaches. 7) Establishes a low cost, high margin, business model for an infinite number of services that is not possible with current market technology. 8) The solution creates a self promoting viral marketing position in which time to market, high margin, low cost, flexibility, compliance reporting, new service creation, consumption based billing are all inherent business drivers that are not enabled by any other solution in the market. 9) The solution establishes an absolute security model and demark point where a provider can guarantee and report on absolute security for any network service connection defined by SSN running on a diverse multi-carrier infrastructure including the internet. 10) The solution allows a network architecture independent of transport. 11) Securely Share Information without Compromising Sources and Methods and without violating Privacy. 12) Protects assets and control while allowing the sharing of mission and time critical information in a secure and auditable fashion. 13) Data Owner Maintains Absolute Control Over Their Data Independent of any other Network Participant. 14) No Need to Send a copy of your Data or Data Bases. 16) No need to proxy security admin to 3rd party. 17) Eliminates Barriers to sharing information of a Political or Technical nature. 18) Simple Integration to New and Legacy Systems. 19) Legacy to Web Apps and Web Services. 20) Absolute Security, Privacy, and Audit Trail Embedded in the Solution. 21) Mutual Authentication, Encryption, Digital Signatures, Function Specific Authorization, Privacy, end to end Logging, Non Repudiation, Usage Based Billing, SLA Reporting. 22) Each participant maintains absolute control over access to their services. The SSGs and GSSG may be either hardware or software implemented in servers and server clusters, desktops, laptops, wireless devices, browsers and the like. See our co-pending applications referenced above all of which are incorporated by reference herein.

Depicted below, FIG. 1 shows a layer model wherein the layers correspond to: Layer 3—Participant business services. Layer 2—SSN managed services infrastructure and services. Layer 1—transport facility (any network).

Utility and value in the invention can be achieved in any industry needing secure information, energy, transportation, finance and banking, medical, legal, etc., sharing across any transport medium, and among other examples, cable television access and digital entertainment media. A safety Deposit Box for data is described below wherein UC represents a programmed user command: (1) UC: Deposit Item—The User selects an item for deposit. The Client app or SSN service encodes and signs the item. The SSN Deposit Item service securely transmits the item to the Service Provider on the network. The Service Provider verifies the item signature, stores the item, and optionally generates a receipt. SSN securely transmits the receipt to the User; (2) UC: Retrieve Item—The User selects an item receipt or a discovery service which results in a menus of items available for recovery. The SSN service securely transmits the receipt or the menu selected item to the participant. The Service retrieves the item. SSN securely transmits the item to the Client. The Client app verifies the item signature, and prompts the User to save the item.

In a File Transfer example, a participant can move a file from one SSG to another SSG with or without user level authentication; verify User/Participant identity for accessing the file; receive a notation that someone received the file; digitally sign the file or payload to assure Tamper Resistance; Encrypt the payload prior to transmission; and encrypt and sign the payload prior to transmission. The service specifies who can access and open the file. For Identity Validation the invention enables secure, quality controlled transaction processing providing an audit trail and other useful features for security and clearing and settlement of documents imaged at a capture site. For example, the a system in one example may image a physical document and create a digital representation which can be broken up into several elements or data files that are digitally signed and securely transmitted over a network wherein the elements can be reassembled in a manner such that the integrity of the original document captured can be guaranteed after reassembly. An audit chain for tracing routes in the transmission of, and access to, the document files is also provided. A particular credential and validating across various identity sources such as DMV, Biometrics repository, etc. may be incorporated. Registered Digital Document Delivery is a further example. The user submits a document to a third party service. Identify individuals entitled to access document and provide notification (passive or active) of who accessed the document and the time of access. For a Notary Service, some form of witness to the identification is generated and, in turn, a signature for that point and time, Using an identity service is generated and recorded. In File Transfer Cases, the architecture for the user is to Move the file, Sign File and move it, Sign file, Encrypt, Move the file with SSG PKI, Sign file Encrypt, Move the file with additional PKI on top of SSN.

Using a given family of PKI services, the PKI will support s/mime with an email client for Secure email, for example, a merchant such as FedEx Kinko's may, using the invention herein, offer a digital document delivery service from their locations; for example, with use for legal electronic document distribution. The invention allows a self selected group having a common community of interest in any subject or service to create and establish a secure network down to a peer to peer participant level at which services may be accessed and published.

The depictions of actual screens in the drawings, further explain the benefits and achievements of the invention for the Department of Homeland Security, sample DHS Services using a Secure Service Network include:

ID Verification
1) Real time confirmation of information on an individual, company, or entity based on credential presented or other search artifacts—Create On-We communities of information sharing that do not risk compromising data owner or methods but support War on Terror operations
2) Answer to a question—Yes/No, Risk Score . . . etc., follow up question . . . .

Alert Distribution
1) Real time secure dissemination of Information
2) End to end knowledge of who and where
3) Verification of Receipt Identity Management
1) Manage historical patterns for stronger validation
2) Offer a new repository for identity verification
3) Avoid Privacy, political and competitive Issues by Giving a Yes/No or Score Card Reply
4) Go to any one of many existing repositories—no need to replicate data Secure Inquire Services
1) Is this a valid ID? Passport . . . etc?
2) Is this a valid SSN#?
3) Is this a valid Address?
4) Is this name on the OFAC List?
5) Is this name on a Terrorist List?
6) Real time end to end audit of activities
7) Privacy of provider can be protected
8) Data owner controls dissemination Intelligence Agencies
1) Do you have any recent information on this name?
2) Is this person on one of the watch lists?
3) Is this a person that you would like detained?
4) By asking simple questions and providing simple answers the DHS can do a much better job and not compromise data repositories, sources and methods, . . . etc., at any of our national intelligence organization A Secure Service Network is comprised of:
1 or more Organizations, Parties, or Participants that provide services
1 or more Organizations, Parties, or Participants that consume services
1 or more Services
1 or more Parties that Manage Organizations
1 or more Parties that Manage Services An Organization is an entity in the Secure Service Network that is a possible Provider and/or Consumer of one or more Services. An organization Is comprised of:
Organization Id
Name
Member As Of Date
Status
Contact Information
And is uniquely identified by an Organization Id (supporting one or more individuals).

A Service refers to a Web Service or Web Application to be provided within the Secure Service Network. A service contains a single definition within the Secure Service Network that describes the inputs and outputs of the function. A Service is comprised of:
Service Id
URL Path
Description
Creation Date
Status
Implementation Detail
WSDL
Schema
Client WAR
Server War
and is uniquely identified by a Service Id.

A Provided Service refers to a Service that an Organization fulfills through the Secure Service Network. An organization can prevent new entitlements to a service by setting the prevent new entitlement indicator. A Provided Service is comprised of:
Organization Id
Service Id
Prevent New Entitlement Indicator
Status
and is uniquely identified by Organization Id and Service Id Service Entitlement specifies a Provided Service of an Organization that can be requested by another Organization within the Secure Service Network. A Service Entitlement is comprised of:
Provided Service
Providing Organization Id
Service Id
Requestor Organization Id
Status
and is uniquely identified by Providing Organization Id, Service Id, and Requesting Organization Id A Certificate is an electronic document used for security purposes. Within the Secure Service Network, a certificate is used for authenticating a Security Proxy. A Certificate is associated to exactly one Security Proxy. An active Security Proxy must have exactly one active certificate in order to be an active service gateway within the Secure Service Network. A Certificate is comprised of:
Serial Number
Host Name
Organization Id
Status
Certificate
and is uniquely identified by Serial Number.

A Security Proxy refers to the gateway component of an SSG. On inbound requests, it is responsible for certificate validation (authentication), and authorization. On outbound requests, it is responsible for providing the certificate for authentication and authorization by the receiving Security Proxy. The Security Proxy listens for inbound service requests and routes them to an internal Service Interface Endpoint. The Security Proxy routes outbound service requests to the destination Security Proxy. An Organization has one or more security proxies for handling service requests. A Security Proxy is comprised of:
Host Name
Organization Id
Status
Certificate
and is uniquely identified by Host Name.

A Service Interface Endpoint refers to the location on the internal network that handles the service request after authentication and authorization validations have been processed by the Security Proxy. An Organization has one or more Service Interface Endpoints for each of its Provided Services. Service Interface Endpoint is comprised of:
Provided Service (Service Id and Organization Id)
Hostname/IP Address
Port
URL Path
Status
and is uniquely identified by Organization Id, Service Id, Hostname, Port, URL Path The Proxy Service Interface indicates the Service Interface Endpoint that a Security Proxy routes service requests to. There must be exactly one Service Interface Endpoint configured for each Service that a Security Proxy will route service requests to. A Service Interface Endpoint may receive service requests by zero or more Security Proxies. The Proxy Service Interface is comprised of:
  Provided Service (Service Id and Organization Id)
  Security Proxy (Hostname)
  Service Interface Endpoint (Hostname, Port, URLPath)
  Status
and is uniquely identified by Organization Id, Service Id, Service Interface Endpoint (Hostname, Port, URLPath) and Security Proxy HostName.

A Party refers to an individual or person that interacts or manages with Organizations and Services. A party authenticates to a system and is authorized according to their role and organization that they are a member of. Parties may authenticate and be authorized to manage other components of the network. Parties may authenticate and be authorized to use services on the network. A Party Is comprised of:
  Party Id
  Organization Id
  First Name
  Last Name
  Middle Init
  Title
  Status
and Is Uniquely Identified by Party Id.

An Individual user may authenticate through a service definition on the SSN. The service may leverage a network repository of users or one or more repositories provided by a participant on the network. In this manner a authentication and/or authorization service can be provided that leverages current credential repositories. In addition, one or more services can switch among a wide range of repositories based on the credential that is presented, the device the request is coming from, the organization that the request is coming, and/or the request. In this manner the solution supports legacy security systems, new security systems, and advanced functionality to include biometrics. The ability to switch among many existing security repositories is significant benefit of the solution because it eliminated replication of data as well as the provisioning of control to a third party.

The invention supports a secure private peer to peer business communications model across any transport. This is accomplished by allowing service providers to create, implement and provision Services unique to them and their defined relationships. The ability for a service provider to maintain complete control over an Access Control List specific to the services and relationships they provide enables this peer to peer functionality. This is accomplished via one or more variations in the base governance model and is implemented by providing a unique ACL to any service provider that desires this capability. By doing this, a participant driven business model is achieved that allows any service provider to create, implement, and provision services independent of any other participant on the network. This allows the a service provider to maintain absolute control over their data and services as well as who can consume them and how a participants is charged for consuming them.

In the Organization:
  status cannot be set to Inactive if Active Provided Services exist
  status cannot be set to Inactive if Active Service Entitlements exist
  cannot be deleted if the status is not Inactive
  cannot be deleted if there are Service Events
  cannot be deleted if there are Provided Services
  cannot be deleted if there are Service Entitlements In a Service
  status cannot be set to Inactive if Active Provided Services exist
  cannot be deleted if the status is not Inactive
  cannot be deleted if there are Service Events
  cannot be deleted if there are Provided Services A Provided Service
  cannot be added if the Organization Status is not Active
  cannot be added if the Service Status is not Active
  status cannot be set to Active if the Service Status is not Active
  status cannot be set to Active if the Organization Status is not Active
  status cannot be set to Inactive if there are Active Service Entitlements
  cannot be deleted if the status is not Inactive
  cannot be deleted if there are Service Events
  cannot be deleted if there are Service Entitlements A Service Entitlement
  cannot be added if the Providing Organization Status is not Active
  cannot be added if the Requesting Organization Status is not Active
  cannot be added if the Service Status is not Active
  status cannot be set to Active if the Providing Organization Status is not Active
  status cannot be set to Active if the Requesting Organization Status is not Active
  status cannot be set to Active if the Service Status is not Active Using a family of PKI management services, the solution enables the use of PKI to support many functions including but not limited to: Identity, encryption, authorization, digital signatures . . . etc. As an example the PKI can be used to support s/mime with an email client for Secure email.

The invention allows a self selected group having a common community of interest in any subject or service to create and establish a secure network down to a peer to peer participant level at which services may be accessed and published.

As part of the process model supported by the invention 3 general implementation patterns for the remote virtual node management are supported. As examples the SSN solution and its components (described in our previous applications and included herein by reference) will be used. !) SSG located behind participant controlled firewall but managed remotely by a third party where the participant controls access to the management of the SSG via service and ACL enforcement. 2) SSG located outside the participants firewall and remotely managed. In this case the Participant can allow the network provider to admin all of its services and has limited direct control. However the participant can optionally see operational and summary activity reporting and data in near real time. 3) SSG is located inside the participant's firewall where the firewall and the SSG are managed by the 3rd party network provider.

SSGs implementation as a manager of the network architecture may include an installation kit much like that of a CD, an appliance like a DSL or cable modem, or a self installation process from a provisioning site where a software package is downloaded, installed, and then initialized through a family of infrastructure services. For individual users, this can be as simple as a software provisioning process or a browser add on. The managed network provider can install this independent or dependent on carrier and provisions it from an SSN management facility. The SSG supports installation on a carrier that is not owned or managed by the network provider. This allows a business entity like a telecommunications provider to provide significant services and business value independent of the carrier transport owner or provider. The SSG can be packaged and deployed on commodity hardware, in a shared, dedicated, single user, or gateway mode. Commodity hardware may include existing PCs and servers, clusters of servers and wireless devices including cell phones and PDAs. Dedicated appliances, cards add ons to a switch, router, PC (NIC) . . . etc. may also be used.

The management facility allows the network provider to provision and manage a network of SSGs (participants) on any network where the provider does not have to own or manage the transport. The management facility and the SSGs allow network provider to provision, report, manage and operate the solution.

The GSSG and SSGs establish the infrastructure that allows for the creation, management and operational reporting for a virtual network topology. This establishes and enforces the security and management reporting in terms of a virtual service connection directly between any group of participants that is defined by a service definition that is provisioned to one or more participants. The invention provides 1) Virtual Service Connection—A secure virtual network connection that is unique and specific to the service definition. It includes mutual authentication of all participants, function specific access control, encryption, logging, non repudiation, privacy, and the ability to map to security elements of existing systems and participants that may integrate or call an SSN service. 2) Service Definition—Service provided by one or more network participants where the network participant can define, publish, and provision who may have Secure access to that service independent of any other participant on the network. A service can be just about anything the needs network communications. This includes applications, web services, appliances, cell phones, wireless devices . . . etc. 3) Service Repository—a repository where services and service relationships may be securely created, provisioned, distributed, and maintained.

Examples of Key Features and Benefits of the managed network include: 1) Ability to secure function specific activity on any IP transport for the duration of the activity, allowing a value added secure manager of the network architecture on a carrier diverse transport including the last mile and even down to the end user on wireless devices. 2) Eliminates the need for dedicated application specific networks. With the network architecture, applications/functions in the old world are service definitions. Each service is secured and executed in a virtual service connection that is secure and independent of all other activity on the network. This allows participants to create and distribute business value independent of anyone else on the network. 3) The solution builds on key artifacts already in place at most Companies including Network Transport, Carrier Telco Contracts, Internet Connectivity, Application and Network Security, and Existing Applications. 4) Implements all of the security and audit elements needed to enter into and enforce a basic business contract as an embedded function of the network. All service connections on the network inherit a common secure infrastructure encompassing the transport and application for all activity making business contracts simple to report on and easy to enforce. 5) The solution is in alignment with the Market Convergence around Networks and Applications and secures Web Services and Service Oriented Architecture Efforts. 6) Facilitates the integration of legacy applications and the secure management of their functionality to a broad consumer base that is not possible with other approaches. 7) The solution creates a self promoting viral marketing position in which time to market, high margin, low cost, flexibility, compliance reporting, new service creation, consumption based billing are all inherent business drivers that are not enabled by any other solution in the market. 8) The solution establishes an absolute security model and demark point where a provider can guarantee and report on absolute security for any network service connection managed by the solution and running on a diverse multi-carrier infrastructure including the internet or MPLS environment. 9) The solution allows a network architecture independent of transport. 10) The solution allows participants to Securely Share Information without Compromising Sources and Methods and without violating Privacy. 11) With the solution a data owner maintains absolute control over their data independent of any other network participant. And 12) Eliminates Barriers to sharing, for example, political, medical, technical and legal information.

Without intending to limit any of the foregoing, or any previously filed applications, a brief summary of various aspects of a domain model, virtual network topology, and business rules for an implementation follow: 1) A Secure Service Network is comprised of: 1 or more Organizations, Parties, or Participants that provide services, 1 or more Organizations, Parties, or Participants that consume services, 1 or more Services, 1 or more Parties that Manage Organizations, 1 or more Parties that Manage Services. 2) Organization: An Organization is an entity in the Secure Service Network that is a possible Provider and/or Consumer of one or more Services. 3) An organization may be comprised of: Organization Id, Name, Member As Of Date, Status, Contact Information, and is uniquely identified by: Organization Id (can support one or more individuals). 4) A Service: A Service refers to a Web Service or Web Application to be provided within the Secure Service Network. A service contains a single definition within the Secure Service Network that describes the inputs and outputs of the function. 5) As an example using a web service, A Service is comprised of: Service Id, URL Path, Description, Creation Date, Status, Implementation Detail, WSDL, Schema, Client WAR, Server War, and is uniquely identified by: Service Id. 6) A Provided Service: A Provided Service refers to a Service that an Organization fulfills through the Secure Service Network. An organization can prevent new entitlements to a service by setting the prevent new entitlement indicator. 7) A Provided Service is comprised of: Organization Id, Service Id, Prevent New Entitlement Indicator, Status, and is uniquely identified by: Organization Id and Service Id. 8) A Service Entitlement, Service Entitlement specifies a Provided Service of an Organization that can be requested by another Organization within the Secure Service Network. A Service Entitlement is comprised of: Provided Service, Providing Organization Id, Service Id, Requestor, Organization Id, Status, and is uniquely identified by: Providing Organization Id, Service Id, and Requesting Organization Id. 9) A Certificate: A Certificate is an electronic document used for security purposes. Within the Secure Service Network, a certificate is used for authenticating a Security Proxy. A Certificate is comprised of: Serial Number, Host Name, Organization Id, Status, Certificate, and is uniquely identified by: Serial Number. 10) A Security Proxy: A Security Proxy refers to the gateway component of an SSG. On inbound requests, it is responsible for certificate validation (authentication), and authorization. On outbound requests, it is responsible for providing the certificate for authentication and authorization by the receiving Security Proxy. The Security Proxy listens for inbound service requests and routes them to an internal Service Interface Endpoint. The Security Proxy routes outbound service requests to the destination Security Proxy. An Organization has one or more security proxies for handling service requests. A Security Proxy is comprised of: Host Name, Organization Id, Status, Certificate, and is uniquely identified by: Host Name. 11) Service Interface Endpoint: A Service Interface Endpoint refers to the location on the internal network that handles the service request after authentication and authorization validations have been processed by the Security Proxy. An Organization has one or more Service Interface Endpoints for each of its Provided Services. 12) Service Interface Endpoint is comprised of: Provided Service (Service Id and Organization Id), Hostname/IP Address, Port, URL Path, Status, And is uniquely identified by: Organization Id, Service Id, Hostname, Port, URL Path. 13) Proxy Service Interface: The Proxy Service Interface indicates the Service Interface Endpoint that a Security Proxy routes service requests to. There must be exactly one Service Interface Endpoint configured for each Service that a Security Proxy will route service requests to. A Service Interface Endpoint may receive service requests by zero or more Security Proxies. Is comprised of: Provided Service (Service Id and Organization Id), Security Proxy (Hostname), Service Interface Endpoint (Hostname, Port, URLPath), Status: Is uniquely identified by: Organization Id, Service Id, Service Interface Endpoint (Hostname, Port, URLPath) and Security Proxy HostName. 14) Party: A Party refers to an individual or person that interacts or manages with Organizations and Services. A party authenticates to a system and is authorized according to their role and organization that they are a member of. Parties may authenticate and be authorized to manage other components of the network. Parties may authenticate and be authorized to use services on the network. Is comprised of: Party Id, Organization Id, First Name, Last Name, Middle Init, Title, Status, Is Uniquely Identified by: Party Id. 15) User Level Security: Individual user may authenticate through a service definition on the SSN. The service may leverage a network repository of users or one or more repositories provided by a participant on the network. In this manner a authentication and/or authorization service can be provided that leverages current credential repositories. In addition, one or more services can switch among a wide range of repositories based on the credential that is presented, the device the request is coming from, the organization that the request is coming, and/or the request. In this manner the solution supports legacy security systems, new security systems, and advanced functionality to include biometrics. The ability to switch among many existing security repositories is significant benefit of the solution because it eliminated replication of data as well as the provisioning of control to a third party. 16) Peer to Peer Model: The invention is unique in its ability to support a secure private peer to peer business communications model across any transport. This is accomplished by allowing service providers to create, implement and provision Services unique to them and their defined relationships. The ability for a service provider to maintain complete control over an Access Control List specific to the services and relationships they provide enables this peer to peer functionality. This is accomplished via one or more variations in the base governance model and is implemented by providing a unique ACL to any service provider that desires this capability. By doing this, a participant driven business model is achieved that allows any service provider to create, implement, and provision services independent of any other participant on the network. This allows a service provider to maintain absolute control over their data and services as well as who can consume them and how a participants is charged for consuming them.

Sample business rules enforced by an example of the invention are provided below for subject areas within an example of a domain model allowing for the creation of a virtual network topology.

The Organization: 1) status cannot be set to Inactive if Active Provided Services exist. 2) status cannot be set to Inactive if Active Service Entitlements exist. 3) cannot be deleted if the status is not Inactive. 4) cannot be deleted if there are Service Events. 5) cannot be deleted if there are Provided Services. 6) cannot be deleted if there are Service Entitlements.

In a Service: 1) status cannot be set to Inactive if Active Provided Services exist. 2) cannot be deleted if the status is not Inactive. 3) cannot be deleted if there are Service Events. 4) cannot be deleted if there are Provided Services A Provided Service: 1) cannot be added if the Organization Status is not Active. 2) cannot be added if the Service Status is not Active. 3) status cannot be set to Active if the Service Status is not Active. 4) status cannot be set to Active if the Organization Status is not Active. 5) status cannot be set to Inactive if there are Active Service Entitlements. 6) cannot be deleted if the status is not Inactive. 7) cannot be deleted if there are Service Events. 8) cannot be deleted if there are Service Entitlements A Service Entitlement: 1) cannot be added if the Providing Organization Status is not Active. 2) cannot be added if the Requesting Organization Status is not Active. 3) cannot be added if the Service Status is not Active. 4) status cannot be set to Active if the Providing Organization Status is not Active. 5) status cannot be set to Active if the Requesting Organization Status is not Active. 6) status cannot be set to Active if the Service Status is not Active In a preferred embodiment using the SSN technology (described in our previously referenced related applications and included herein by reference) a general description of the functions and components provided by the network provider includes: A) The SSG, a Virtual Network On Ramp, providing Participant Service Implementation, Logging & Log Storage, Legacy system integration, allowing devices to connect to it to request services from other providers, in function a Security Proxy providing Authentication and Authorization, Encryption and Decryption, and Logging; and B) The GSSG 1) the Administration and Reporting Portal, a Service Implementation with Logging & Log Storage, Legacy system integration, allows devices to connect to it to request services from other providers, provides Billing and SLA Reporting, Provisioning, Infrastructure Services; 2) Service Repository for Security Proxy, Authentication and Authorization, Encryption and Decryption, and Logging; and 3) the Credential Management provider of Directory Services to provide ACL information to the network, Certificate Authority, CRL and PKI Lifecycle Services, and Self Service Enrollment Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A secure virtual network wherein a service is provided to a given requestor through a virtual service connection created between the service and the given requestor upon successful mutual authentication and authorization of the given requestor for the service, comprising:

a pre-existing network comprising multiple participants, each connected to the pre-existing network by an appliance, the participants including uniquely identifiable service providers and uniquely identifiable requestors, each service provider offering at least one service through an openable and closeable gateway behind a firewall connected to the pre-existing network, the service listed in a service definition in a repository and specific to a given requestor;

an infrastructure architecture implemented via a distributed governance model wherein each provider is responsible for authenticating and authorizing each requestor, wherein successful mutual authentication comprises: a) the given requestor providing the service definition to a gateway connecting the given requestor to the pre-existing network, the given requestor gateway comparing the service definition to a record for that service, the record comprising a response code, a response reason, a request size, a response size, an identity of the given requestor and the service provider, a service URL, a unique origination identifier, a unique given requestor identifier, a unique correlation identifier, a local infrastructure identifier, a remote infrastructure identifier, an originator host, a destination host, a destination port, and instructions for fulfilling the request, and, upon a match of the service definition to the record, the given requestor gateway opens and allows the given requestor to request the service; and b) the exchange of digital certificates between the service gateway and the given requestor gateway, the certificates each comprising a serial number, a host name, an organization ID, and a status, and, upon mutual validation, opening a secure socket layer encrypted tunnel between the service gateway and the given requestor gateway, the tunnel specific to the service and the request;

wherein successful authorization comprises, upon opening of the tunnel, confirmation that the given requestor is listed on an access control list (ACL), the ACL listing certain services accessible by the given requestor, the ACL maintained by the service provider and wherein the provisioning of the service is mapped end to end for reporting, administration, and security tracking, and wherein the virtual service connection is created independent of, and unknown to any other providers and requestors on the network and disposed of when the service has been provided to the given requestor; and a data base to provide audit and report management of each provisioning of service activity on the network, the data comprising records identified by a unique request identifier for each request.

2. The network of claim 1 wherein the service provided to the given requestor is provided to another participant at a different fee than the fee charged the given requestor.

3. The network of claim 1 wherein the service provider controls access to each of the service provider's services via the service definition, the service definition comprising a service ID, a service description, a service type, and creation date.

4. The network of claim 1 wherein the provider is a bank and the service is one of Bank to Bank, Bank to Corp Customer, Bank to Retail Customer, Bank To Small Business and Bank to Government.

5. The network of claim 1 wherein the appliance is selected from the group consisting of a PC, a laptop and a wireless device.

6. The network of claim 1 wherein the virtual service connection is isolated, private, secure, and tracked independently of other virtual service connection on the pre-existing network.

7. The network of claim 1 wherein the service definition provides for the creation and addition of a new service.

8. The network of claim 1 wherein the provider interacts with a second provider to provide the service.

9. The network of claim 1 wherein multiple virtual secure connections are created among participants having a common community of interest.

10. The network of claim 1 wherein virtual secure connections between a bank, a customer, and a gaming site facilitate real time settlement and clearing of gaming activity.

11. The network of claim 1 wherein the service is a collection of services aggregated from other service providers.

* * * * *